US012658787B2

(12) United States Patent
Chin et al.

(10) Patent No.: US 12,658,787 B2
(45) Date of Patent: Jun. 16, 2026

(54) POWER FACTOR CORRECTION CIRCUIT AND POWER FACTOR CORRECTION CIRCUIT CONTROL METHOD

(71) Applicant: Huawei Digital Power Technologies Co., Ltd., Shenzhen (CN)

(72) Inventors: Ken Chin, Shenzhen (CN); Yuanjun Liu, Shenzhen (CN); Shanglin Mo, Dongguan (CN); Liangyun Kang, Shenzhen (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 339 days.

(21) Appl. No.: 18/497,028

(22) Filed: Oct. 30, 2023

(65) Prior Publication Data

US 2024/0055982 A1 Feb. 15, 2024

Related U.S. Application Data

(63) Continuation of application No. PCT/CN2021/091698, filed on Apr. 30, 2021.

(51) Int. Cl.
*H02M 1/42* (2007.01)
*H02M 1/00* (2006.01)

(52) U.S. Cl.
CPC ....... *H02M 1/4208* (2013.01); *H02M 1/0058* (2021.05); *H02M 1/4233* (2013.01)

(58) Field of Classification Search
CPC .... H02M 1/42; H02M 1/4208; H02M 1/4225; H02M 1/4233
See application file for complete search history.

(56) References Cited

U.S. PATENT DOCUMENTS

| | | | |
|---|---|---|---|
| 9,654,024 B2 | 5/2017 | Cohen | |
| 2011/0075462 A1* | 3/2011 | Wildash | H02M 1/4208 |
| | | | 363/127 |

(Continued)

FOREIGN PATENT DOCUMENTS

| | | |
|---|---|---|
| CN | 205027804 U | 2/2016 |
| CN | 105393447 A | 3/2016 |

(Continued)

OTHER PUBLICATIONS

Su et al., "Totem-Pole Boost Bridgeless PFC Rectifier With Simple Zero-Current Detection and Full-Range ZVS Operating at the Boundary of DCM/CCM", IEEE Transactions on Power Electronics, IEEE, Feb. 2011, vol. 26, No. 2, 9 pages.

(Continued)

*Primary Examiner* — Alex Torres-Rivera
(74) *Attorney, Agent, or Firm* — Maier & Maier, PLLC

(57) ABSTRACT

A power conversion circuit and a power conversion circuit control method. The power conversion circuit determines polarity of an alternating current voltage by using a PFC circuit controller, determines, based on a current of an inductor, a signal for controlling a secondary switch to be turned off, determines, based on a voltage at a midpoint of a series connection between a switching transistor S1 and a switching transistor S2, a signal for controlling the secondary switch to be turned on again and a signal for controlling a primary switch to be turned off, and performs PWM control on the switching transistor S1 and the switching transistor S2.

20 Claims, 16 Drawing Sheets

(56) References Cited

U.S. PATENT DOCUMENTS

| | | | |
|---|---|---|---|
| 2019/0115861 A1* | 4/2019 | Ogura | H02M 1/0085 |
| 2019/0305671 A1 | 10/2019 | Matsuura et al. | |
| 2021/0226528 A1* | 7/2021 | Gu | H02M 1/4233 |
| 2021/0313875 A1* | 10/2021 | Messina | H02M 1/4208 |
| 2022/0345033 A1* | 10/2022 | Mesa | H02M 1/4233 |

FOREIGN PATENT DOCUMENTS

| | | |
|---|---|---|
| CN | 105634295 A | 6/2016 |
| CN | 104518656 B | 10/2018 |
| CN | 111049368 A | 4/2020 |
| CN | 111953198 A | 11/2020 |
| WO | 2015095699 A1 | 6/2015 |

OTHER PUBLICATIONS

Huang et al., "Predictive ZVS Control With Improved ZVS Time Margin and Limited Variable Frequency Range for a 99% Efficient, 130-W/in3 MHz GaN Totem-Pole PFC Rectifier", IEEE Transactions on Power Electronics, IEEE, Jul. 2019, vol. 34, No. 7, 13 pages.

* cited by examiner

Primary
switch (S2)

Secondary
switch (S1)

iL

Voltage
at SW1

$t_0$  $t_1$  $t_2$  $t_3$

POWER FACTOR CORRECTION CIRCUIT AND POWER FACTOR CORRECTION CIRCUIT CONTROL METHOD

CROSS-REFERENCE TO RELATED APPLICATIONS

This application is a continuation of International Application No. PCT/CN2021/091698, filed on Apr. 30, 2021, the disclosure of which is hereby incorporated by reference in its entirety.

TECHNICAL FIELD

Embodiments relate to the field of circuit technologies and to a power conversion circuit and a power conversion circuit control method.

BACKGROUND

With the development of modern technologies, power supplies have been applied in various fields. For example, an adapter power supply of a personal computer (PC) and charging power supplies of terminals such as a mobile phone and a tablet computer are all quite important power supply devices in people's daily life. These power supplies usually need to convert an alternating current into a direct current to supply power to a direct current electrical device. Therefore, an alternating current-direct current circuit (AC-DC circuit) in a power supply is quite important. A totem-pole power factor correction (PFC) circuit can implement functions of rectification and PFC through a single stage, includes a few conduction components, and is an efficient AC-DC circuit. FIG. 1 is a principle diagram of a totem-pole PFC circuit in a conventional technology. The totem-pole PFC circuit includes an alternating current input, a PFC inductor L, a switch S1, a switch S2, a switch S3, a switch S4, an output filter capacitor $C_{OUT}$, and a load. To improve efficiency of the totem-pole PFC circuit, zero voltage switching (ZVS) control on the switch S1 and the switch S2 needs to be implemented.

However, currently, there is no good ZVS solution used to implement ZVS control on the switch S1 and the switch S2.

SUMMARY

Embodiments provide a power conversion circuit and a power conversion circuit control method to implement ZVS of a switching transistor in a PFC circuit.

According to a first aspect, an embodiment provides a power conversion circuit, including a power factor correction PFC circuit module and a PFC circuit controller. The PFC circuit module includes a switching transistor S1, a switching transistor S2, a switching transistor S3, a switching transistor S4, an inductor L, a capacitor $C_O$, an alternating current input terminal, and a load; the inductor L and the alternating current input terminal are connected in series between a midpoint of a series connection between the switching transistor S1 and the switching transistor S2 and a midpoint of a series connection between the switching transistors S3 and the switching transistor S4; two ends of the series connection between the switching transistor S1 and the switching transistor S2 and two ends of the series connection between the switching transistor S3 and the switching transistor S4 are connected in parallel with the load; the capacitor $C_O$ is connected in parallel with the load; and the PFC circuit controller is configured to perform PWM control on the switching transistor S1 and the switching transistor S2 based on an acquired voltage of the load, a current of the inductor L, an alternating current voltage at the alternating current input terminal, and a voltage at the midpoint of the series connection between the switching transistor S1 and the switching transistor S2.

In the first aspect, the PFC circuit controller may perform PWM control on the switching transistor S1 and the switching transistor S2 based on the acquired voltage of the load, the current of the inductor L, the alternating current voltage at the alternating current input terminal, and the voltage at the midpoint of the series connection between the switching transistor S1 and the switching transistor S2, to implement ZVS of the switching transistor S1 and the switching transistor S2.

With reference to the first aspect, in an implementation of this embodiment, the PFC circuit controller includes: a voltage sampling unit configured to obtain the voltage of the load; a current sampling unit configured to obtain the current of the inductor L; an alternating current signal processing unit configured to: obtain the alternating current voltage at the alternating current input terminal, and output a polarity identifier of the alternating current voltage and an alternating current sampling voltage based on the alternating current voltage, where the alternating current sampling voltage is obtained based on sampling of the alternating current voltage; a turn-off control unit, configured to output a current polarity identifier of the inductor L, a result of comparison between the current of the inductor L and a first threshold, and a result of comparison between the voltage of the load and the alternating current sampling voltage based on the current of the inductor L, the voltage of the load, and the alternating current sampling voltage; a turn-on control unit, configured to output a first turn-on indication signal and a second turn-on indication signal based on the voltage at the midpoint of the series connection between the switching transistor S1 and the switching transistor S2 and the polarity identifier of the alternating current voltage; and a pulse width modulation (PWM) control unit, configured to perform PWM control on the switching transistor S1 and the switching transistor S2 based on the first turn-on indication signal, the second turn-on indication signal, the polarity identifier of the alternating current voltage, the current polarity identifier of the inductor L, the result of comparison between the current of the inductor L and the first threshold, and the result of comparison between the voltage of the load and the alternating current sampling voltage.

In this implementation, the circuit determines polarity of the alternating current voltage by using the alternating current signal processing unit, determines, based on the current of the inductor by using the turn-off control unit, a signal for controlling a secondary switch to be turned off, determines, based on the voltage at the midpoint of the series connection between the switching transistor S1 and the switching transistor S2 by using the turn-on control unit, a signal for controlling the secondary switch to be turned on again and a signal for controlling a primary switch to be turned off, and performs PWM control on the switching transistor S1 and the switching transistor S2 by using the pulse width modulation (PWM) control unit. The circuit can control, based on the current of the inductor, the secondary switch to be turned off, and control, based on the voltage at the midpoint of the series connection between the switching transistor S1 and the switching transistor S2, the secondary switch to be turned on again and the primary switch to be turned off, to implement ZVS of the switching transistors in the PFC circuit.

With reference to the first aspect, in an implementation of this embodiment, the turn-on control unit is configured to: detect a change rate of the voltage at the midpoint of the series connection between the switching transistor S1 and the switching transistor S2; select one of a first comparison value and a second comparison value based on the polarity identifier of the alternating current voltage to obtain a first turn-on comparison value, and select one of a third comparison value and a fourth comparison value based on the polarity identifier of the alternating current voltage to obtain a second turn-on comparison value; compare the change rate with the first turn-on comparison value to obtain the first turn-on indication signal; and compare the change rate with the second turn-on comparison value to obtain the second turn-on indication signal. In this implementation, the turn-on control unit may determine, based on the change rate of the voltage at the midpoint of the series connection, a time period in which the voltage at the midpoint of the series connection is increased and a time period in which the voltage at the midpoint of the series connection is decreased, to determine a time period in which the voltage at the midpoint of the series connection reaches a maximum value and a time period in which the voltage at the midpoint of the series connection reaches a minimum value, that is, determine a moment at which the voltage at the midpoint of the series connection just reaches the maximum value and a moment at which the voltage at the midpoint of the series connection just reaches the minimum value; and then indicate the moments by using the first turn-on indication signal and the second turn-on indication signal.

With reference to the first aspect, in an implementation of this embodiment, the turn-on control unit includes a detection circuit, a 2-to-1 multiplexer MUX1, a 2-to-1 multiplexer MUX2, a comparator CMP2, a comparator CMP3, and a NOT gate INV1, where the detection circuit includes a detection capacitor and a detection resistor that are connected in series, a first end of the detection capacitor is connected to the midpoint of the series connection between the switching transistor S1 and the switching transistor S2, a second end of the detection capacitor is connected to a first end of the detection resistor, and a second end of the detection resistor is grounded; a midpoint of the series connection between the detection capacitor and the detection resistor is connected to a first input end of the comparator CMP2 and a first input end of the comparator CMP3; a control terminal of the 2-to-1 multiplexer MUX1 is connected to an interface corresponding to the polarity identifier of the alternating current voltage, two input terminals thereof respectively receive inputs of a first voltage and a second voltage, and an output terminal thereof is connected to a second input end of the comparator CMP2; a control terminal of the 2-to-1 multiplexer MUX2 is connected to the interface corresponding to the polarity identifier of the alternating current voltage, two input terminals thereof respectively receive inputs of a third voltage and a fourth voltage, and an output terminal thereof is connected to a second input end of the comparator CMP3; an output end of the comparator CMP2 outputs the first turn-on indication signal; and an output end of the comparator CMP3 outputs the second turn-on indication signal by using the NOT gate INV1. In this implementation, the turn-on control unit detects a change status of the voltage at the midpoint of the series connection between the switching transistor S1 and the switching transistor S2 by using the detection capacitor and the detection resistor that are connected in series, to accurately determine a moment at which the voltage at the midpoint of the series connection between the switching transistor S1 and the switching transistor S2 is increased to the voltage of the load or decreased to 0. According to this implementation, the solution provided in this embodiment can be more comprehensive.

With reference to the first aspect, in an implementation of this embodiment, the turn-off control unit is configured to: compare the current of the inductor L with a preset inductance current zero-crossing threshold to obtain the current polarity identifier of the inductor L; obtain the first threshold through calculation based on the alternating current sampling voltage; compare the current of the inductor L with the first threshold to obtain the result of comparison between the current of the inductor L and the first threshold; and obtain the result of comparison between the voltage of the load and the alternating current sampling voltage through calculation based on the voltage of the load and the alternating current sampling voltage. According to this implementation, the solution provided in this embodiment can be more comprehensive.

With reference to the first aspect, in an implementation of this embodiment, the turn-off control unit includes a threshold calculation subunit, a voltage comparison subunit, a comparator CMP4, and a comparator CMP5, where a first input end of the comparator CMP4 receives the current of the inductor L, a second input end thereof receives a preset inductance current zero-crossing threshold, and an output end thereof outputs the current polarity identifier of the inductor L; a first input end of the comparator CMP5 receives the current of the inductor L, and an output end thereof outputs the result of comparison between the current of the inductor L and the first threshold; the threshold calculation subunit is configured to: obtain the first threshold through calculation based on the alternating current sampling voltage, and output the first threshold to a second input end of the comparator CMP5; and the voltage comparison subunit is configured to obtain and output the result of comparison between the voltage of the load and the alternating current sampling voltage based on the voltage of the load and the alternating current sampling voltage. According to this implementation, the solution provided in this embodiment can be more comprehensive.

With reference to the first aspect, in an implementation of this embodiment, the threshold calculation subunit is configured to: obtain the first threshold through calculation based on the alternating current sampling voltage and the voltage of the load and output the first threshold to the second input end of the comparator CMP5. According to this implementation, the solution provided in this embodiment can be more comprehensive.

With reference to the first aspect, in an implementation of this embodiment, the alternating current signal processing unit is configured to: capture the alternating current voltage at two ends of the alternating current input terminal; sample the alternating current voltage to obtain the alternating current sampling voltage; and compare the alternating current sampling voltage with a zero-crossing threshold of the alternating current sampling voltage to obtain the polarity identifier of the alternating current voltage. According to this implementation, the solution provided in this embodiment can be more comprehensive.

With reference to the first aspect, in an implementation of this embodiment, the alternating current signal processing unit includes an alternating current voltage sampling subunit and a comparator CMP1; the alternating current voltage sampling subunit is connected to the two ends of the alternating current input terminal, and is configured to obtain and output the alternating current sampling voltage based on the alternating current voltage at the alternating current input terminal; and a first input end of the comparator CMP1 receives the alternating current sampling voltage, a second input end thereof receives the zero-crossing threshold of the alternating current sampling voltage, and an output end thereof outputs the polarity identifier of the alternating current voltage. According to this implementation, the solution provided in this embodiment can be more comprehensive.

With reference to the first aspect, in an implementation of this embodiment, the current sampling unit includes a sampling resistor, a voltage sensor, and a calculation subunit; the sampling resistor is connected in series in a line between the load and the alternating current input terminal; the voltage sensor is connected to two ends of the sampling resistor, and is configured to detect a voltage at the two ends of the sampling resistor; and the calculation subunit is connected to the voltage sensor, and is configured to calculate the current of the inductor L based on the voltage at the two ends of the sampling resistor and a resistance value of the sampling resistor. According to this implementation, the solution provided in this embodiment can be more comprehensive.

With reference to the first aspect, in an implementation of this embodiment, the current sampling unit is a current transformer; and the current transformer is connected to one end of the inductor L, and is configured to detect the current of the inductor L. According to this implementation, the solution provided in this embodiment can be more comprehensive.

With reference to the first aspect, in an implementation of this embodiment, when the alternating current input terminal outputs a positive voltage, the switching transistor S2 is a primary switch, and the switching transistor S1 is a secondary switch, the PWM control unit is configured to: when Ts is greater than Ts_min and tcm_flag is a first preset value, determine, based on the current polarity identifier icom0 of the inductor L, a moment at which the secondary switch is turned off, and determine, based on the second turn-on indication signal, a moment at which the primary switch is turned on, where Ts is a time of timing started after the primary switch is turned on last time, Ts_min is a specified minimum period limit, and tcm_flag is an identifier of the result of comparison between the voltage of the load and the alternating current sampling voltage; when Ts is greater than Ts_min and tcm_flag is a second preset value, determine, based on the result icom1 of comparison between the current of the inductor L and the first threshold, a moment at which the secondary switch is turned off, and determine, based on the second turn-on indication signal, a moment at which the primary switch is turned on; when Ts is less than Ts_min and tcm_flag is a first preset value, determine, based on the current polarity identifier icom0 of the inductor L, a moment at which the secondary switch is turned off, and after Ts is greater than Ts_min, determine, based on the second turn-on indication signal, a moment at which the primary switch is turned on; or when Ts is less than Ts_min and tcm_flag is a second preset value, determine, based on the current polarity identifier icom0 of the inductor L, a moment at which the secondary switch is turned off for the first time, and after Ts is greater than Ts_min, determine, based on the first turn-on indication signal, a moment at which the secondary switch is turned on again, determine, based on icom1, a moment at which the secondary switch is turned off again, and determine, based on the second turn-on indication signal, a moment at which the primary switch is turned on. According to this implementation, the solution provided in this embodiment can be more comprehensive.

According to a second aspect, an embodiment provides a power conversion circuit control method. The circuit control method is used to control the circuit according to the first aspect, and includes: obtaining a voltage at two ends of a load in the circuit, a current passing through an inductor L, and an alternating current voltage at an alternating current input terminal; determining polarity of the alternating current voltage and an alternating current sampling voltage based on the alternating current voltage, where the alternating current sampling voltage is obtained based on sampling of the alternating current voltage; determining a current polarity identifier of the inductor L, a result of comparison between the current of the inductor L and a first threshold, and a result of comparison between the voltage of the load and the alternating current sampling voltage based on the current of the inductor L, the voltage of the load, and the alternating current sampling voltage; determining a first turn-on indication signal and a second turn-on indication signal based on a voltage at a midpoint of a series connection between a switching transistor S1 and a switching transistor S2 in the circuit and a polarity identifier of the alternating current voltage; and performing pulse width modulation (PWM) control on the switching transistor S1 and the switching transistor S2 based on the first turn-on indication signal, the second turn-on indication signal, the polarity identifier of the alternating current voltage, the current polarity identifier of the inductor L, the result of comparison between the current of the inductor L and the first threshold, and the result of comparison between the voltage of the load and the alternating current sampling voltage.

With reference to the second aspect, in an implementation of this embodiment, the determining a first turn-on indication signal and a second turn-on indication signal based on a voltage at a midpoint of a series connection between a switching transistor S1 and a switching transistor S2 in the circuit and a polarity identifier of the alternating current voltage includes: detecting a change rate of the voltage at the midpoint of the series connection between the switching transistor S1 and the switching transistor S2 in the circuit; selecting one of a first comparison value and a second comparison value based on the polarity identifier of the alternating current voltage to obtain a first turn-on comparison value, and selecting one of a third comparison value and a fourth comparison value based on the polarity identifier of the alternating current voltage to obtain a second turn-on comparison value; comparing the change rate with the first turn-on comparison value to obtain the first turn-on indication signal; and comparing the change rate with the second turn-on comparison value to obtain the second turn-on indication signal. According to this implementation, the solution provided in this embodiment can be more comprehensive.

With reference to the second aspect, in an implementation of this embodiment, when the alternating current input terminal outputs a positive voltage, the switching transistor S2 is a primary switch, and the switching transistor S1 is a secondary switch, the method includes: when Ts is greater than Ts_min and tcm_flag is a first preset value, determining, based on the current polarity identifier icom0 of the inductor L, a moment at which the secondary switch is turned off, and determining, based on the second turn-on indication signal, a moment at which the primary switch is turned on, where Ts is a time of timing started after the primary switch is turned on last time, Ts_min is a specified minimum period limit, and tcm_flag is an identifier of the result of comparison between the voltage of the load and the alternating current sampling voltage; when Ts is greater than Ts_min and tcm_flag is a second preset value, determining, based on the result icom1 of comparison between the current of the inductor L and the first threshold, a moment at which the secondary switch is turned off, and determining, based on the second turn-on indication signal, a moment at which the primary switch is turned on; when Ts is less than Ts_min and tcm_flag is a first preset value, determining, based on icom0, a moment at which the secondary switch is turned off, and after Ts is greater than Ts_min, determining, based on the second turn-on indication signal, a moment at which the primary switch is turned on; or when Ts is less than Ts_min and tcm_flag is a second preset value, determining, based on icom0, a moment at which the secondary switch is turned off for the first time, and after Ts is greater than Ts_min, determining, based on the first turn-on indication signal, a moment at which the secondary switch is turned on again, determining, based on icom1, a moment at which the secondary switch is turned off again, and determining, based on the second turn-on indication signal, a moment at which the primary switch is turned on. According to this implementation, the solution provided in this embodiment can be more comprehensive.

According to a third aspect, an embodiment provides a power supply, including the power conversion circuit according to the first aspect.

BRIEF DESCRIPTION OF DRAWINGS

FIG. 8b is a circuit waveform diagram corresponding to the alternating current signal processing unit 507 shown in FIG. 8a;

DETAILED DESCRIPTION OF EMBODIMENTS

The following describes in detail solutions in embodiments with reference to the accompanying drawings.

Figures 1, 2A:
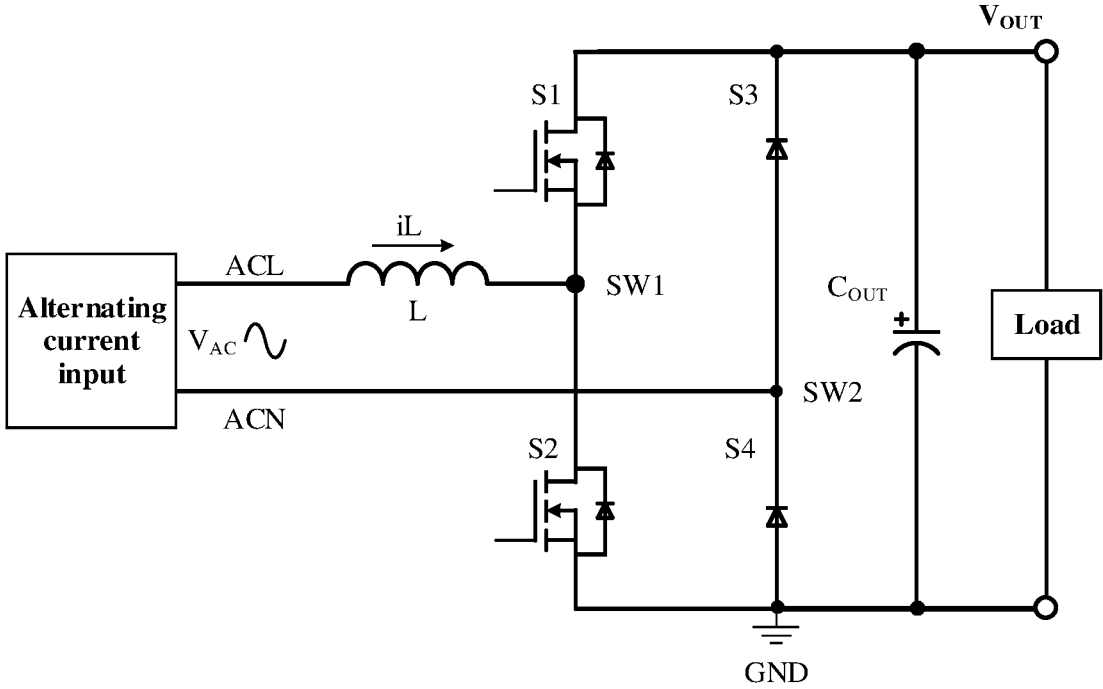
FIG. 1 is a principle diagram of a totem-pole PFC circuit according to an embodiment.
FIG. 2a is a schematic diagram 1 of a working principle of a totem-pole PFC circuit.
Figure 2B:
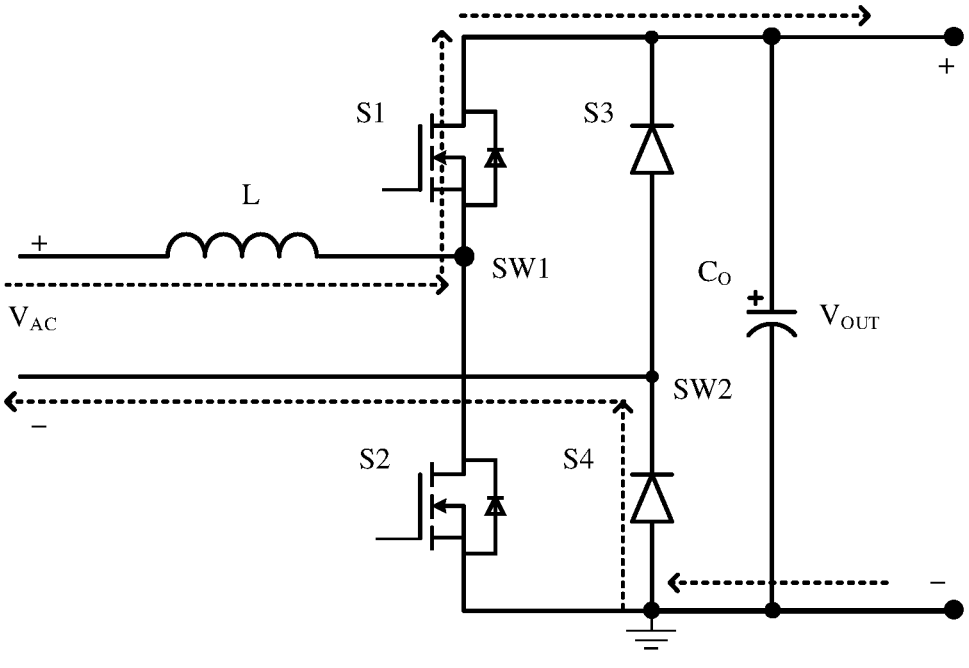
FIG. 2b is a schematic diagram 2 of a working principle of a totem-pole PFC circuit.
Figure 2C:
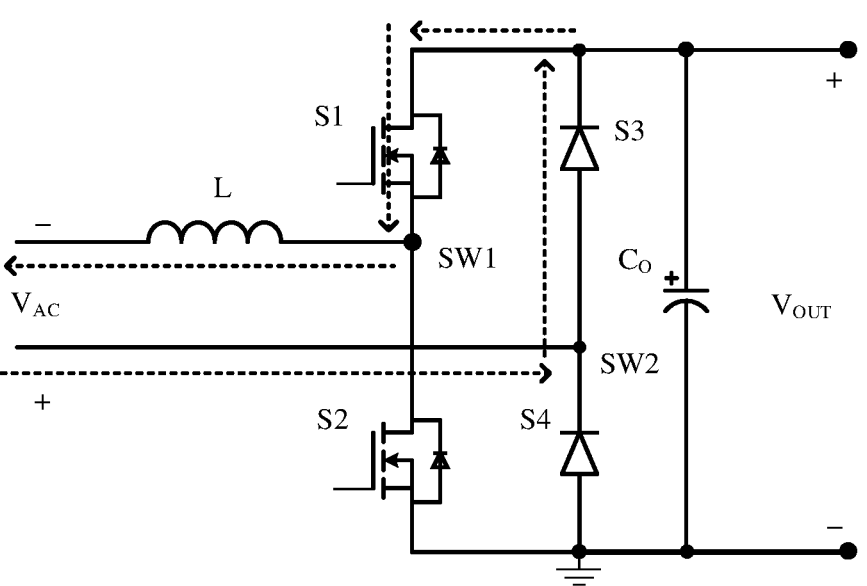
FIG. 2c is a schematic diagram 3 of a working principle of a totem-pole PFC circuit.
Figure 2D:
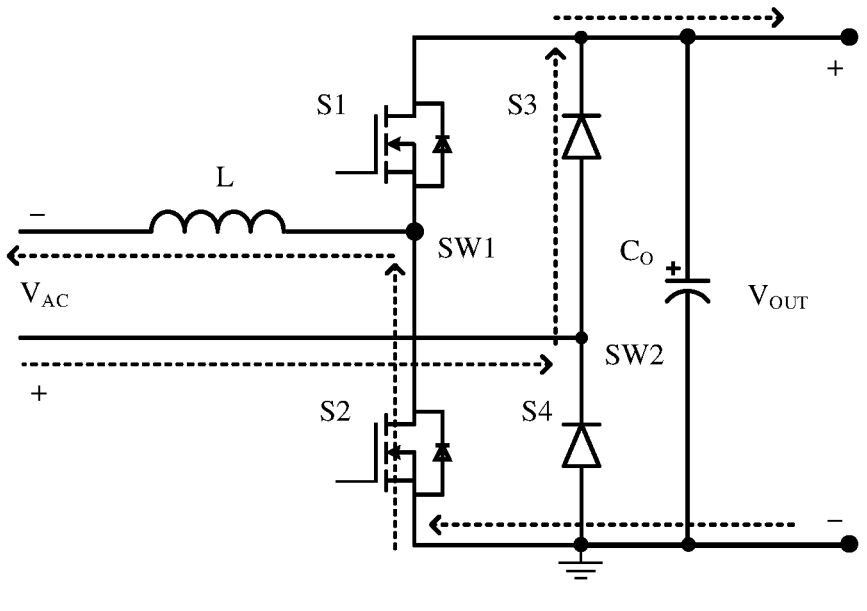
FIG. 2d is a schematic diagram 4 of a working principle of a totem-pole PFC circuit.
Figure 3:
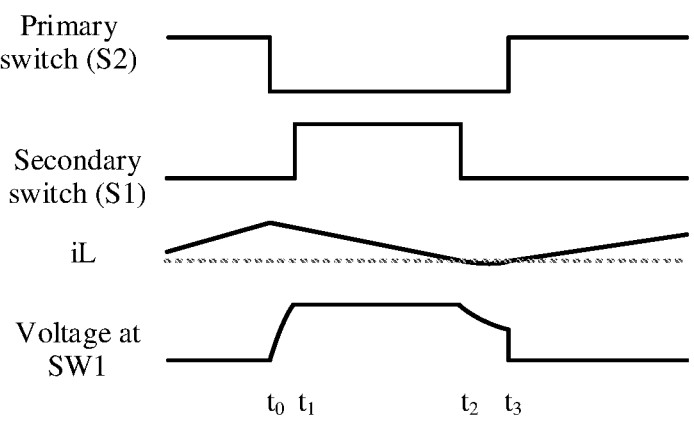
FIG. 3 is an operating waveform diagram of a PFC circuit in a CRM mode according to an embodiment.
Figure 4:
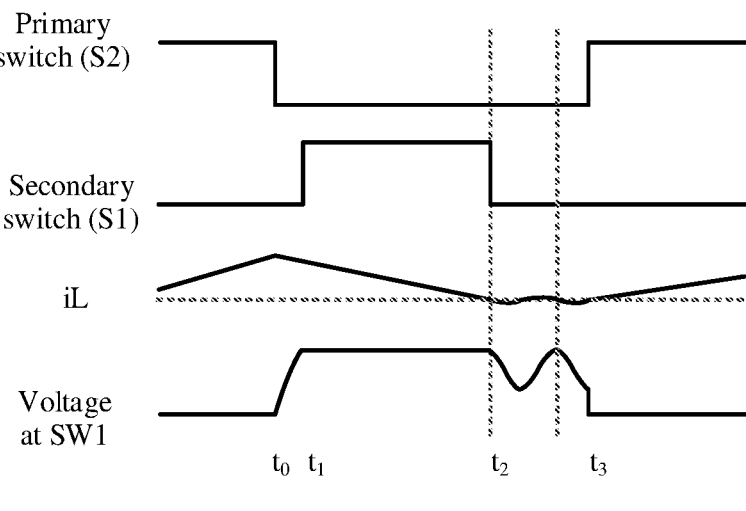
FIG. 4 is an operating waveform diagram of a PFC circuit in a DCM mode according to an embodiment.

FIG. 1 is a principle diagram of a totem-pole PFC circuit according to an embodiment. A totem-pole power factor correction (PFC) circuit can implement functions of rectification and PFC through a single stage, includes a few conduction components, and is an efficient AC-DC circuit. The totem-pole PFC circuit shown in FIG. 1 includes an alternating current input, a PFC inductor L, four switches S1 to S4, an output filter capacitor $C_{OUT}$, and a load. S1 and S2 each may be a field effect transistor or transistor made of a material such as a silicon (Si) semiconductor material or a third-generation wide band gap semiconductor material silicon carbide (SiC) or gallium nitride (GaN), and includes but is not limited to a metal-oxide semiconductor field-effect transistor (MOSFET), a high electron mobility field-effect transistor (HEMT), or an insulated gate bipolar transistor (IGBT). S3 and S4 each may be a MOSFET, an HEMT, an IGBT, or a diode made of a material such as Si, SiC, or GaN. FIG. 2a is a schematic diagram 1 of a working principle of a totem-pole PFC circuit. FIG. 2b is a schematic diagram 2 of a working principle of a totem-pole PFC circuit. FIG. 2c is a schematic diagram 3 of a working principle of a totem-pole PFC circuit. FIG. 2d is a schematic diagram 4 of a working principle of a totem-pole PFC circuit. When an input $V_{AC}$ is positive, working principles are shown in FIG. 2a and FIG. 2b. S4 is turned on, S2 is turned on as a primary switching transistor to charge the inductor, and S1 is turned on as a secondary switching transistor to discharge the inductor. When the input $V_{AC}$ is negative, working principles are shown in FIG. 2c and FIG. 2d. S3 is turned on, S1 is turned on as a primary switching transistor to charge the inductor, and S2 is turned on as a secondary switching transistor to discharge the inductor. In a low-power application, the totem-pole PFC circuit works in a critical conduction mode (CRM) or a discontinuous conduction mode (DCM), and a peak current automatically follows an input voltage waveform to implement a PFC function (generally, in a low-power application, the totem-pole PFC circuit uses a CRM/DCM mode). With an increase of power, the peak current is increased, leading to excessively large current stress. Therefore, a continuous conduction mode (CCM) needs to be used after the power is increased. For example, when $V_{AC}$ is positive, operating waveforms are shown in FIG. 3 and FIG. 4 (FIG. 3 is an operating waveform diagram of a PFC circuit in a CRM mode according to an embodiment. FIG. 4 is an operating waveform diagram of a PFC circuit in a DCM mode according to an embodiment). In the CRM mode, a secondary switch is turned off (at a moment $t_2$) when an inductance current reaches 0, and then a primary switch is turned on after a relatively short dead time (from the moment $t_2$ to a moment $t_3$ in FIG. 3). In the DCM mode, a secondary switch is turned off, and then a primary switch is turned on after a relatively long resonance time (from a moment $t_2$ to a moment $t_3$ in FIG. 4). The DCM mode is a working mode entered after a maximum frequency limit is set to prevent a working frequency in the CRM mode from being excessively high.

To improve efficiency of the totem-pole PFC circuit, zero voltage switching (ZVS) control on S1 and S2 needs to be implemented. A CRM mode when $V_{AC}$ is positive is used as an example. As shown in FIG. 3, at a moment $t_0$, after the primary switch (S2) is turned off, an inductance current charges a parasitic capacitor of S2 and discharges a parasitic capacitor of S1. After a voltage at a point SW1 is increased to $V_{OUT}$ (a turn-on voltage drop of S1 is ignored), the secondary switch (S1) is turned on, so that ZVS of S1 is implemented. Because the inductance current is relatively large in this process, ZVS of the secondary switch is relatively easy to implement. At the moment $t_2$, the inductance current is 0, and the secondary switch (S1) is turned off. Then, the inductor L resonates with the parasitic capacitors of S1 and S2. When $V_{AC}>0.5V_{OUT}$, resonant energy cannot enable the voltage at SW1 to resonate to 0, and the primary switch (S2) can be turned on only at the moment $t_3$ when the voltage is a valley voltage. In a DCM mode, a case is similar to that in the CRM mode. Therefore, in the CRM/DCM mode, full-range ZVS of the primary switch in the totem-pole PFC circuit cannot be implemented.

Figure 5:
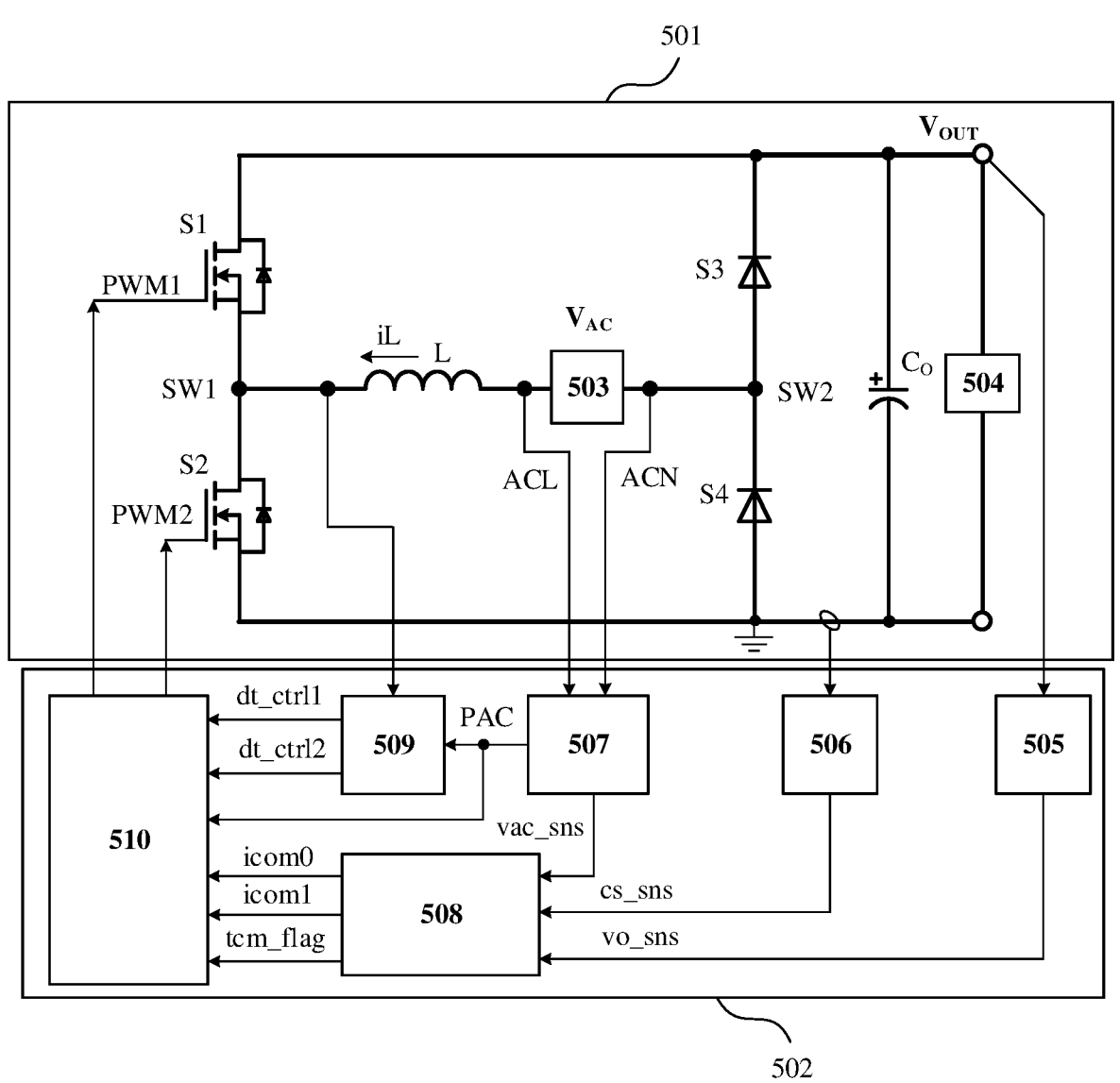
FIG. 5 is a schematic diagram of a circuit according to an embodiment.

To resolve the foregoing problem, an embodiment provides a circuit. A primary switch in the circuit can implement ZVS to resolve a problem that full-range ZVS of a primary switch in a totem-pole PFC circuit cannot be implemented. FIG. 5 is a schematic diagram of a circuit according to an embodiment. The circuit includes a power factor correction PFC circuit module 501 and a PFC circuit controller 502.

The PFC circuit module 501 includes a switching transistor S1, a switching transistor S2, a switching transistor S3, a switching transistor S4, an inductor L, a capacitor $C_O$, an alternating current input terminal 503, and a load 504. The inductor L and the alternating current input terminal 503 are connected in series between a midpoint SW1 of a series connection between the switching transistor S1 and the switching transistor S2 and a midpoint SW2 of a series connection between the switching transistors S3 and the switching transistor S4. Two ends of the series connection between the switching transistor S1 and the switching transistor S2 and two ends of the series connection between the switching transistor S3 and the switching transistor S4 are connected in parallel with the load 504. The capacitor $C_O$ is connected in parallel with the load 504.

The PFC circuit controller 502 includes:

a voltage sampling unit 505, configured to obtain a voltage vo_sns of the load 504;

a current sampling unit 506, configured to obtain a current cs_sns of the inductor L;

an alternating current signal processing unit 507, configured to: obtain an alternating current voltage $V_{AC}$ at the alternating current input terminal 503, and output a polarity identifier PAC of the alternating current voltage and an alternating current sampling voltage vac_sns based on the alternating current voltage $V_{AC}$. The alternating current sampling voltage vac_sns is obtained based on sampling of the alternating current voltage $V_{AC}$;

a turn-off control unit 508, configured to output a current polarity identifier icom0 of the inductor L, a result icom1 of comparison between the current of the inductor L and a first threshold, and a result tcm_flag of comparison between the voltage of the load 504 and the alternating current sampling voltage based on the current cs_sns of the inductor L, the voltage vo_sns of the load 504, and the alternating current sampling voltage vac_sns;

a turn-on control unit 509, configured to output a first turn-on indication signal dt_ctrl1 and a second turn-on indication signal dt_ctrl2 based on a voltage at the midpoint SW1 of the series connection between the switching transistor S1 and the switching transistor S2 and the polarity identifier PAC of the alternating current voltage; and a pulse width modulation (PWM) control unit 510, configured to perform PWM control on the switching transistor S1 and the switching transistor S2 based on the first turn-on indication signal dt_ctrl1, the second turn-on indication signal dt_ctrl2, the polarity identifier PAC of the alternating current voltage, the current polarity identifier icom0 of the inductor L, the result icom1 of comparison between the current of the inductor L and the first threshold, and the result tcm_flag of comparison between the voltage of the load 504 and the alternating current sampling voltage.

The following describes each unit of the PFC circuit controller 502 in detail.

1. Voltage Sampling Unit 505

In this embodiment, the voltage sampling unit 505 may be a voltage sensor, a voltage sampling circuit, or the like. The voltage sampling unit 505 may be connected to two ends of the load 504 to obtain the sampling voltage vo_sns based on sampling of an output voltage $V_{OUT}$ at the two ends of the load 504. In some cases, as shown in FIG. 5, if one end of the load 504 is grounded, the voltage sampling unit 505 may alternatively be connected to only a non-grounded end of the load 504.

2. Current Sampling Unit 506

Figure 6:
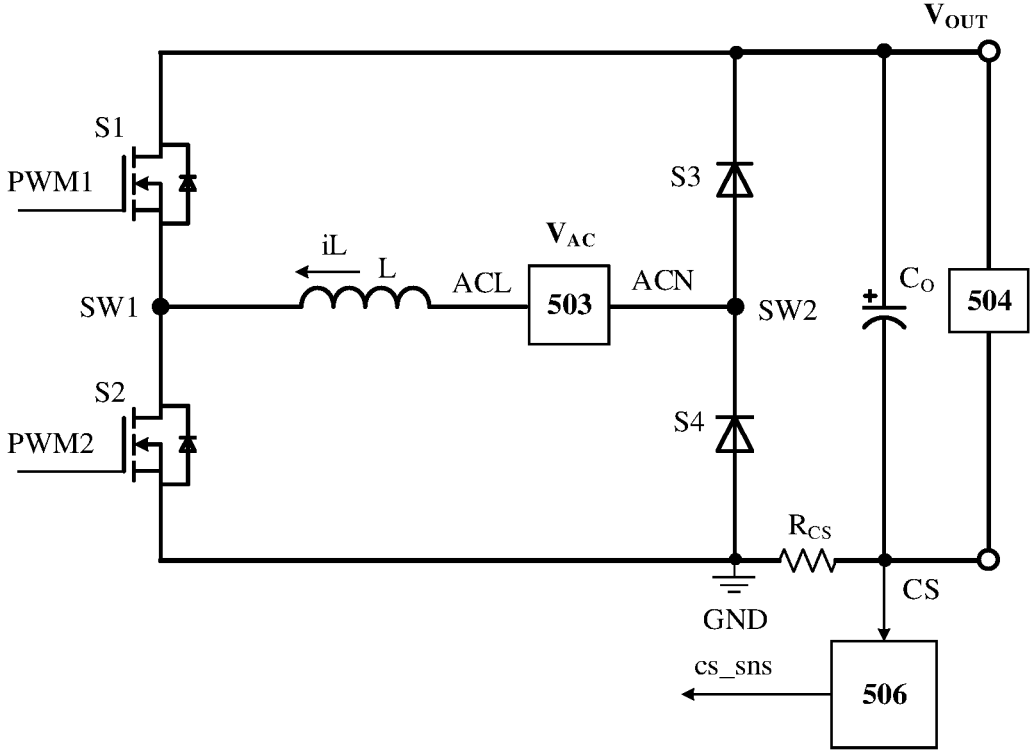
FIG. 6 is a schematic diagram of a current sampling unit 506 in an embodiment.

In this embodiment, the current sampling unit 506 configured to obtain the current cs_sns of the inductor L may be implemented in a plurality of manners. This embodiment provides the following two of the manners:

FIG. 6 is a schematic diagram of a current sampling unit 506 in an embodiment. As shown in FIG. 6, the current sampling unit 506 includes a sampling resistor $R_{CS}$, a voltage sensor, and a calculation subunit. The sampling resistor $R_{CS}$ is connected in series in a line between the load 504 and the alternating current input terminal 503. The voltage sensor is connected to two ends of the sampling resistor $R_{CS}$ (in FIG. 6, because one end of the sampling resistor $R_{CS}$ is grounded, the voltage sensor is connected to only a non-grounded end of the sampling resistor $R_{CS}$), and is configured to detect a voltage at the two ends of the sampling resistor $R_{CS}$. The calculation subunit is connected to the voltage sensor and is configured to calculate the current cs_sns of the inductor L based on the voltage at the two ends of the sampling resistor $R_{CS}$ and a resistance value of the sampling resistor $R_{CS}$. For example, the current passing through the sampling resistor $R_{CS}$ may be obtained by dividing the voltage at the two ends of the sampling resistor $R_{CS}$ by the resistance value of the sampling resistor $R_{CS}$. It can be understood from the circuit shown in FIG. 6 that the current flowing through the sampling resistor $R_{CS}$ may reflect the current flowing through the inductor L.

Figure 7:
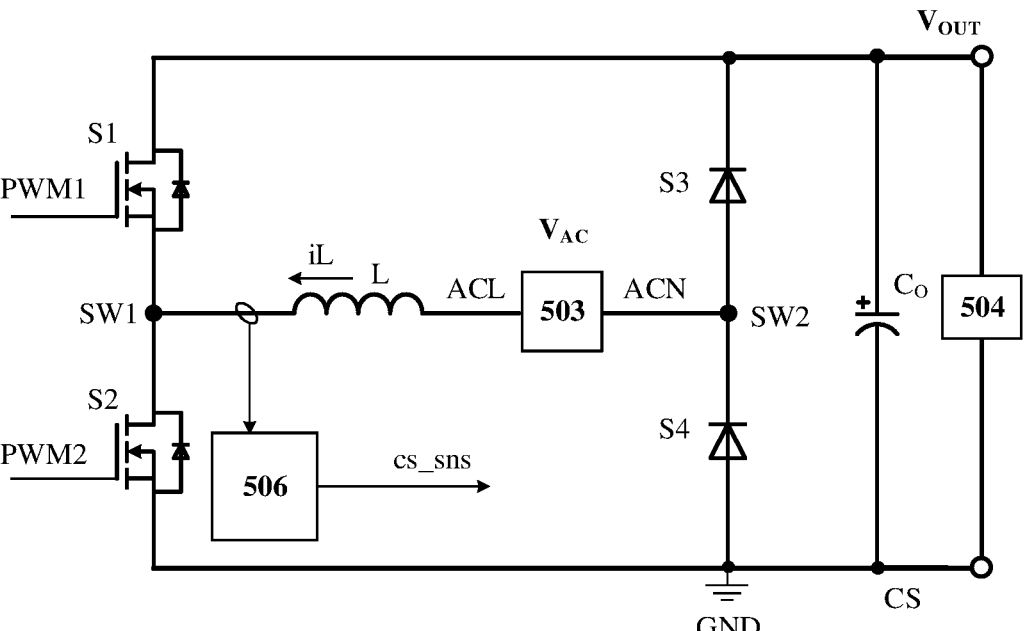
FIG. 7 is a schematic diagram of another current sampling unit 506 in an embodiment.

FIG. 7 is a schematic diagram of another current sampling unit 506 in an embodiment. As shown in FIG. 7, the current sampling unit 506 is a current transformer (CT). The current transformer is connected to one end of the inductor L, and is configured to detect the current cs_sns of the inductor L.

It may be understood that in actual application, the current cs_sns of the inductor L may be obtained in a plurality of manners. This is not limited in the embodiments.

3. Alternating Current Signal Processing Unit 507

Figure 8A:
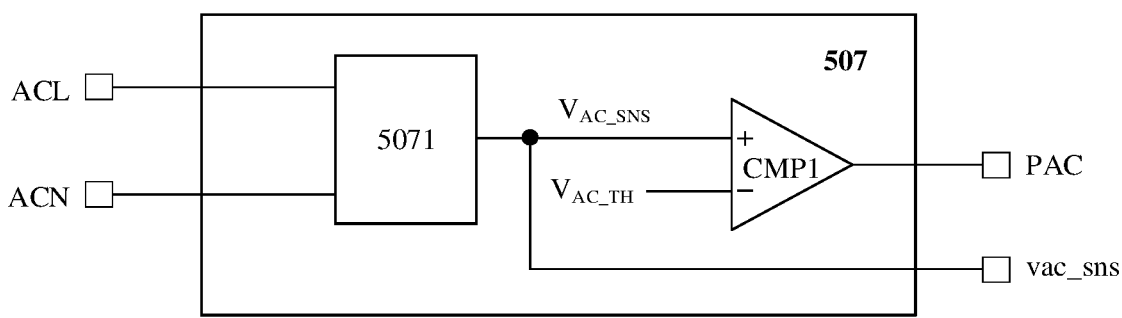
FIG. 8a is a schematic diagram of an alternating current signal processing unit 507 according to an embodiment.

In this embodiment, the alternating current signal processing unit 507 is configured to: obtain the alternating current voltage $V_{AC}$ at the alternating current input terminal 503, and output the polarity identifier PAC of the alternating current voltage and the alternating current sampling voltage vac_sns based on the alternating current voltage $V_{AC}$. The alternating current sampling voltage vac_sns is obtained based on sampling of the alternating current voltage $V_{AC}$. The alternating current signal processing unit 507 may be implemented in a plurality of implementations. One of the implementations is provided as follows in this embodiment:

FIG. 8a is a schematic diagram of an alternating current signal processing unit 507 according to an embodiment. The alternating current signal processing unit 507 includes an alternating current voltage sampling subunit and a comparator CMP1. The alternating current voltage sampling subunit is connected to two ends of the alternating current input terminal 503 (an ACL end is configured to connect to an alternating current live wire, and an ACN end is configured to connect to an alternating current neutral wire), and is configured to obtain and output the alternating current sampling voltage vac_sns based on the alternating current voltage $V_{AC}$ at the alternating current input terminal 503. A first input end of the comparator CMP1 receives the alternating current sampling voltage vac_sns, a second input end thereof receives a zero-crossing threshold $V_{AC\_TH}$ of the alternating current sampling voltage, and an output end thereof outputs the polarity identifier PAC of the alternating current voltage.

Figure 8B:
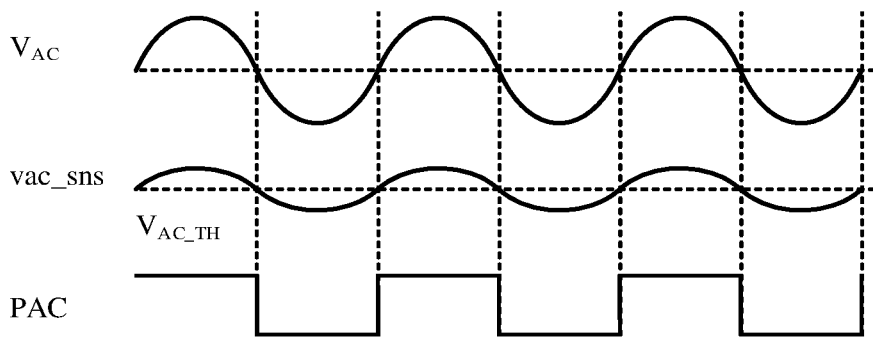

FIG. 8b is a circuit waveform diagram corresponding to the alternating current signal processing unit 507 shown in FIG. 8a. It can be understood that the alternating current sampling voltage vac_sns is obtained after the alternating current voltage $V_{AC}$ at the alternating current input terminal 503 is sampled by the alternating current voltage sampling subunit. In addition, the comparator CMP1 is configured to compare the alternating current sampling voltage vac_sns with the zero-crossing threshold $V_{AC\_TH}$. If the alternating current sampling voltage vac_sns is greater than the zero-crossing threshold $V_{AC\_TH}$ (that is, a voltage at the ACL end is greater than a voltage at the ACN end, and the voltage at the alternating current input terminal 503 is positive), 1 (PAC=1) is output. If the alternating current sampling voltage vac_sns is less than the zero-crossing threshold $V_{AC\_TH}$ (that is, the voltage at the ACL end is less than the voltage at the ACN end, and the voltage at the alternating current input terminal 503 is negative), 0 (PAC=0) is output.

4. Turn-Off Control Unit 508

Figure 9A:
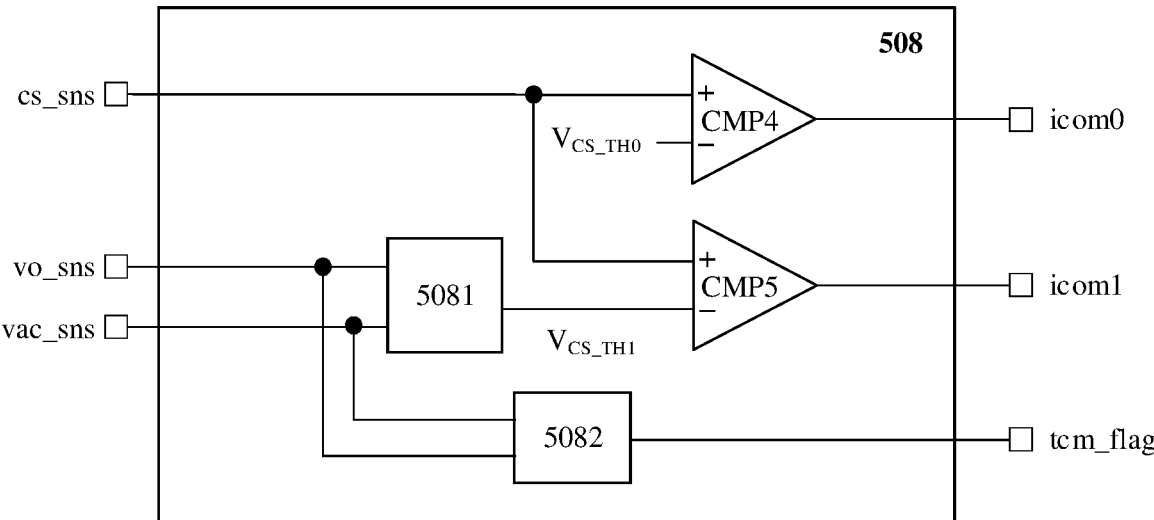
FIG. 9a is a schematic diagram of a turn-off control unit 508 according to an embodiment.

In this embodiment, the turn-off control unit 508 is configured to output the current polarity identifier icom0 of the inductor L, the result icom1 of comparison between the current of the inductor L and the first threshold $V_{CS\_TH1}$, and the result tcm_flag of comparison between the voltage of the load 504 and the alternating current sampling voltage based on the current cs_sns of the inductor L, the voltage vo_sns of the load 504, and the alternating current sampling voltage vac_sns. The turn-off control unit 508 may be implemented in a plurality of implementations. One of the implementations is provided as follows in this embodiment:

FIG. 9a is a schematic diagram of a turn-off control unit 508 according to an embodiment. The turn-off control unit 508 includes a threshold calculation subunit, a voltage comparison subunit, a comparator CMP4, and a comparator CMP5. A first input end of the comparator CMP4 receives the current cs_sns of the inductor L, a second input end thereof receives a preset inductance current zero-crossing threshold $V_{CS\_TH0}$, and an output end thereof outputs the current polarity identifier icom0 of the inductor L. A first input end of the comparator CMP5 receives the current cs_sns of the inductor L, and an output end thereof outputs the result icom1 of comparison between the current cs_sns of the inductor L and the first threshold $V_{CS\_TH1}$. The threshold calculation subunit is configured to: obtain the first threshold $V_{CS\_TH1}$ through calculation based on the alternating current sampling voltage, and output the first threshold $V_{CS\_TH1}$ to a second input end of the comparator CMP5. The voltage comparison subunit is configured to obtain and output the result of comparison between the voltage vo_sns of the load 504 and the alternating current sampling voltage vac_sns based on the voltage vo_sns of the load 504 and the alternating current sampling voltage vac_sns.

Figures 9B, 10A:
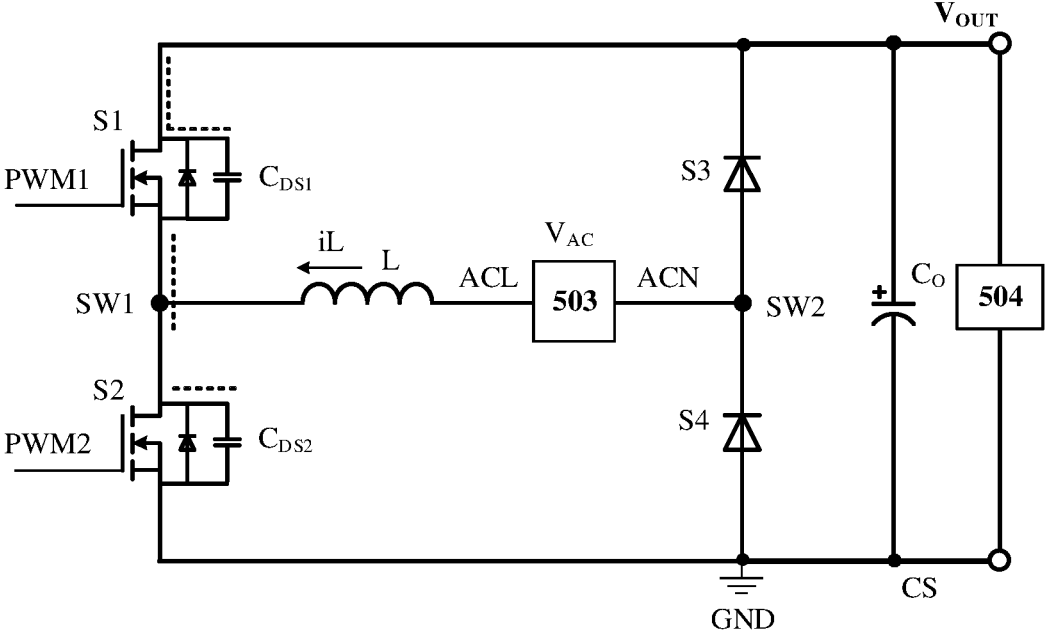
FIG. 9b is a schematic diagram of a circuit in which an inductor resonates with parasitic capacitors in an embodiment.
FIG. 10a is a waveform diagram 1 of comparison with an inductance current in an embodiment.

A signal output by the turn-off control unit 508 shown in FIG. 9a may be used to control a moment at which a secondary switch is turned off. After the secondary switch is turned off, the inductor L resonates with parasitic capacitors of the switching transistor S1 and the switching transistor S2, as shown in FIG. 9b (FIG. 9b is a schematic diagram of a circuit in which the inductor resonates with the parasitic capacitors in an embodiment). To enable the voltage at SW1 to be increased to $V_{OUT}$ or decreased to 0 after the secondary switch is turned off, to implement ZVS of a primary switch, at the turn-off moment, an inductance current needs to meet the following formula:

$$i_L^2 \geq \frac{C_{DS} \cdot V_{OUT} \cdot (2|V_{AC}| - V_{OUT})}{L},$$

where $C_{DS}=C_{DS1}+C_{DS2}$, $C_{DS1}$ includes a parasitic capacitance of the switching transistor S1 and an external capacitance, and $C_{DS2}$ includes a parasitic capacitance of the switching transistor S2 and an external capacitance.

It can be understood from the foregoing conditional formula that, when $|V_{AC}| \leq 0.5V_{OUT}$, the foregoing formula is always met. For example, if the secondary switch is turned off when the inductance current is 0, the voltage at SW1 may be increased to $V_{OUT}$ or decreased to 0 through resonance. When $|V_{AC}| > 0.5V_{OUT}$, the foregoing formula needs to be met when the secondary switch is turned off. $V_{CS\_TH0}$ is an inductance current zero-crossing threshold. When cs_sns is lower than $V_{CS\_TH0}$, icom0 is set to zero. For example, at a moment at which the inductance current crosses zero, a waveform thereof is shown in FIG. 10a. $V_{CS\_TH1}$ is an inductance current threshold (that is, the first threshold) that meets the foregoing formula.

$$V_{CS\_TH1} = \sqrt{\frac{C_{DS} \cdot vo\_sns \cdot (2|vac\_sns| - vo\_sns)}{L}}.$$

Figure 10B:
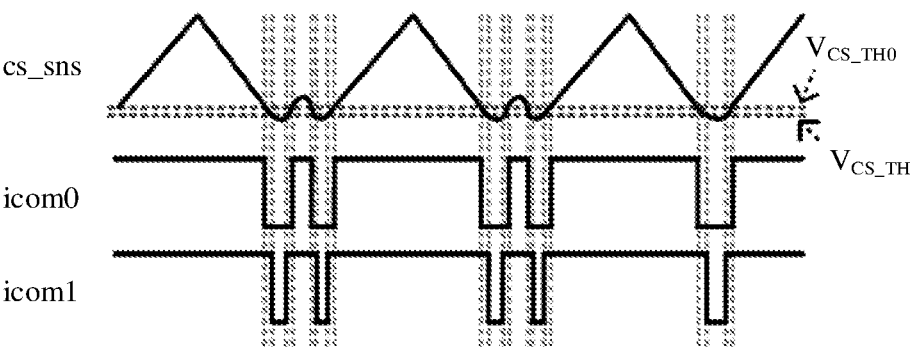
FIG. 10b is a waveform diagram 2 of comparison with an inductance current in an embodiment.

When cs_sns is less than $V_{CS\_TH1}$, icom1 is set to zero. For example, at a moment at which the inductance current meets the foregoing conditional formula, a waveform thereof is shown in FIG. 10*b*.

The foregoing case is a case in which the current sampling unit 506 uses the manner shown in FIG. 6 to perform inductance current sampling to obtain the inductance current cs_sns. In some other cases, the current sampling unit 506 uses the manner shown in FIG. 7 to perform inductance current sampling to obtain the inductance current cs_sns. In this case, a waveform of the inductance current cs_sns is changed, as shown in FIG. 10*b*. Although the waveform of the inductance current cs_sns is changed, the foregoing conditional formula is still applicable. Therefore, the turn-off control unit 508 provided in this embodiment has wide applicability.

A formula for calculating the first threshold is:

$$V_{CS\_TH1} = \sqrt{\frac{C_{DS} \cdot vo\_sns \cdot (2|vac\_sns| - vo\_sns)}{L}}$$

In some other embodiments, the formula for calculating the first threshold may be simplified as follows: It is specified that vo_sns=vac_sns, and $$k = \sqrt{\frac{C_{DS}}{L}}$$

is substituted into the formula to obtain a simplified formula for calculating the first threshold:

$$V_{CS\_TH1} = k \cdot |vac\_sns|$$

Figure 11A:
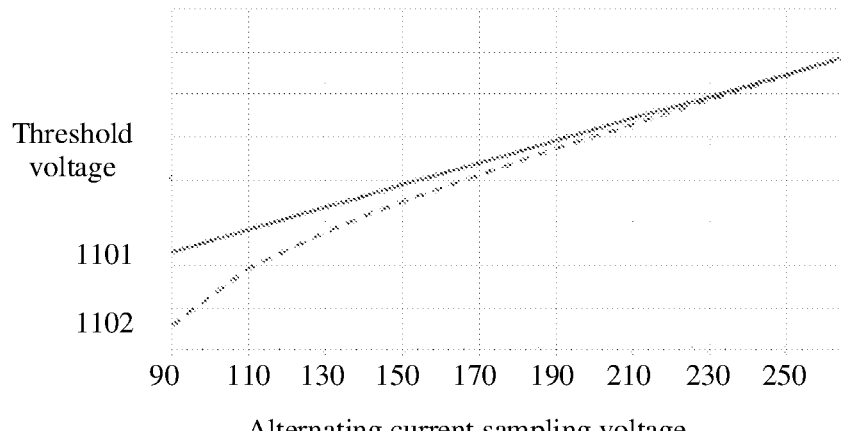
FIG. 11a is a diagram 1 of a curve between a threshold and an input voltage in an embodiment.

When input voltages (effective values) are different, $V_{CS\_TH1}$ is calculated based on a voltage peak point in the input voltages, and a curve between threshold voltages $V_{CS\_TH1}$ corresponding to different input voltages and the different input voltages may be drawn, as shown in FIG. 11*a*. FIG. 11*a* is a diagram 1 of a curve between a threshold and an input voltage in an embodiment. A line 1101 represents a curve corresponding to the formula for calculating the first threshold, and a line 1102 represents a curve corresponding to the simplified formula for calculating the first threshold. It can be understood from the foregoing that both the threshold curves obtained through approximation meet the conditional formula of the inductance current. Therefore, in some cases, the threshold calculation subunit in the turn-off control unit 508 can calculate the first threshold without sampling an output voltage. The threshold calculation subunit can perform, by using the simplified formula for calculating the first threshold, logical calculation based on the alternating current sampling voltage and a related parameter configured in the threshold calculation subunit, to obtain the first threshold. This solution involves easier calculation and is easier to implement.

In some other embodiments, the simplified formula for calculating the first threshold may alternatively be transformed into the following:

$$V_{CS\_TH1} = k1 \cdot |vac\_sns| \qquad V_{AC} > V_{TH0}$$

$$V_{CS\_TH1} = k2 \cdot |vac\_sns| - a \quad V_{AC} \le V_{TH0}$$

$$k1 = \sqrt{\frac{C_{DS}}{L}}$$

Figure 11B:
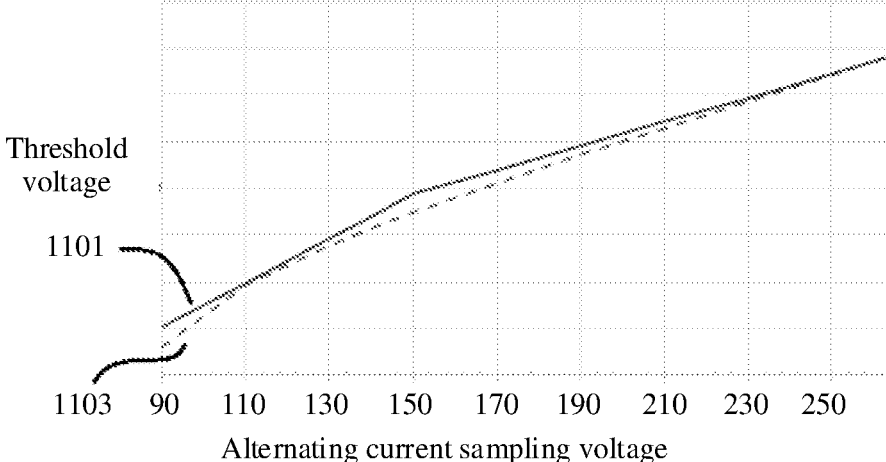
FIG. 11b is a diagram 2 of a curve between a threshold and an input voltage in an embodiment.

In this transformed formula, the threshold calculation subunit may adjust parameters k2 and a to obtain a more appropriate threshold setting on the premise that a requirement of the conditional formula of the inductance current is met, without sampling an output voltage. In addition, calculation is simple and is easy to implement. FIG. 11*b* is a diagram 2 of a curve between a threshold and an input voltage in an embodiment. A line 1101 represents a curve corresponding to the formula for calculating the first threshold, and a line 1103 represents a curve corresponding to the transformed formula. It can be understood that the line 1103 is relatively similar to the line 1101, and both the lines can meet the conditional formula of the inductance current.

The following describes the voltage comparison subunit in detail.

Figure 12:
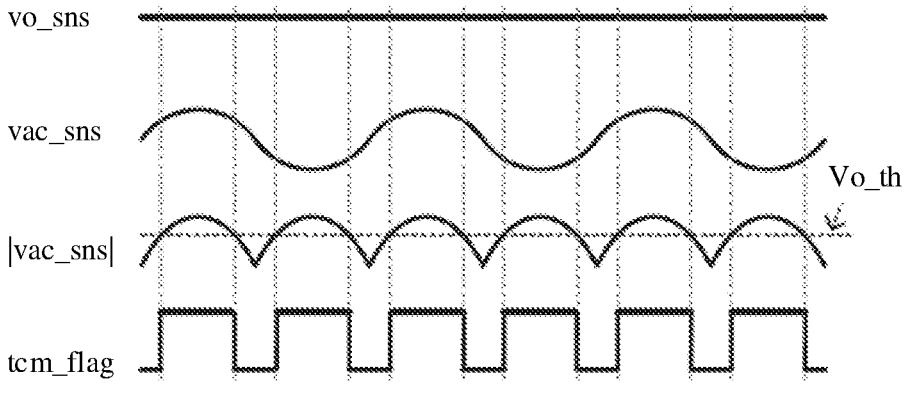
FIG. 12 is a diagram of an input waveform and an output waveform of a voltage comparison subunit according to an embodiment.

It can be understood from the foregoing conditional formula that, when $|V_{AC}| \le 0.5V_{OUT}$, icom0 is used to detect a moment at which the inductance current crosses zero; and when $|V_{AC}| > 0.5V_{OUT}$, icom1 is used to detect a moment at which the inductance current meets the foregoing conditional formula. In this embodiment, two cases, such as $|V_{AC}| \le 0.5V_{OUT}$ and $|V_{AC}| > 0.5V_{OUT}$, may be determined and distinguished by using the voltage comparison subunit. For example, a half of the voltage vo_sns of the load 504 is compared with the alternating current sampling voltage vac_sns. It is assumed that a half of the voltage vo_sns of the load 504 is $V_{O\_th}$. When $|vac\_sns| \le V_{O\_th}$, that is, $|V_{AC}| \le 0.5V_{OUT}$, tcm_flag is set to 0 (tcm_flag is a first preset value in some embodiments); otherwise, tcm_flag is set to 1 (tcm_flag is a second preset value in some embodiments). A corresponding waveform diagram is shown in FIG. 12 (FIG. 12 is a diagram of an input waveform and an output waveform of the voltage comparison subunit according to this embodiment).

5. Turn-on Control Unit 509

In this embodiment, the turn-on control unit 509 outputs the first turn-on indication signal dt_ctrl1 and the second turn-on indication signal dt_ctrl2 based on the voltage at the midpoint SW1 of the series connection between the switching transistor S1 and the switching transistor S2 and the polarity identifier PAC of the alternating current voltage. The first turn-on indication signal dt_ctrl1 is used to determine a moment at which the secondary switch is turned on again, and the second turn-on indication signal dt_ctrl2 is used to determine a moment at which the primary switch is turned on. For example, the turn-on control unit 509 detects a change rate dV/dt of the voltage at the bridge arm midpoint, and then enables the PWM control unit 510 to control, based on the change rate dV/dt, the primary switch to be turned on, to implement ZVS of the primary switch. In some cases, the PWM control unit 510 may alternatively control, based on the change rate dV/dt, the secondary switch to be turned on again. To further ensure accurate determining, the turn-on control unit 509 may perform proper processing on the change rate dV/dt of the voltage at the bridge arm midpoint, to output the first turn-on indication signal dt_ctrl1 and the second turn-on indication signal dt_ctrl2. This embodiment provides the following processing manner:

The turn-on control unit 509 detects a change rate of the voltage at the midpoint of the series connection between the switching transistor S1 and the switching transistor S2 by using a detection circuit; selects one of a first comparison value and a second comparison value based on the polarity identifier of the alternating current voltage by using a 2-to-1 multiplexer MUX1 to obtain a first turn-on comparison value, and selects one of a third comparison value and a fourth comparison value based on the polarity identifier of the alternating current voltage by using a 2-to-1 multiplexer MUX2 to obtain a second turn-on comparison value; compares the change rate with the first turn-on comparison value by using a comparator CMP2, to obtain the first turn-on indication signal dt_ctrl1; and compares the change rate with the second turn-on comparison value by using a comparator CMP3, to obtain the second turn-on indication signal dt_ctrl2. The foregoing case is described below by using FIG. 13.

Figure 13:
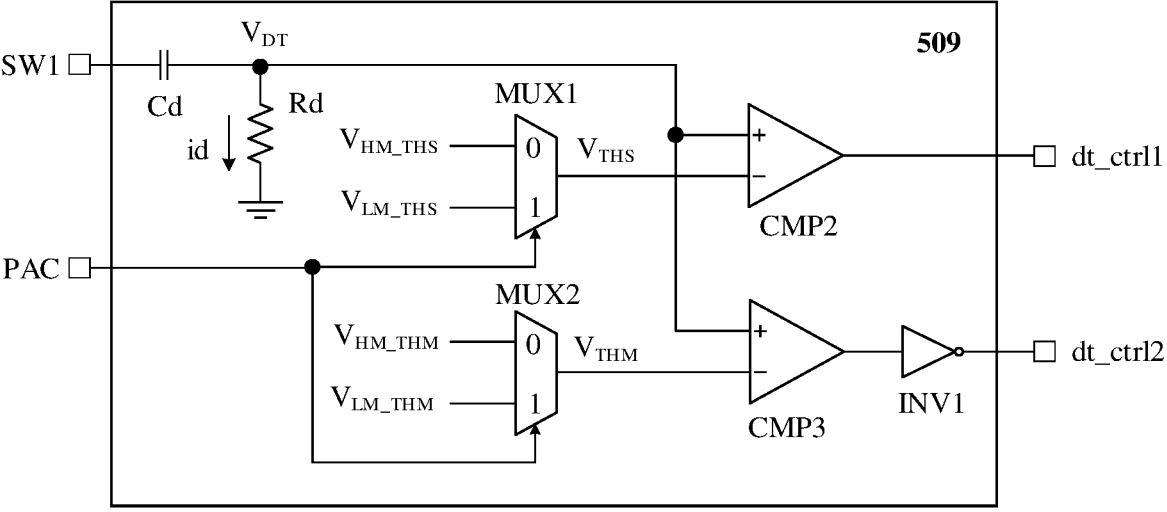
FIG. 13 is a schematic diagram of a turn-on control unit 509 according to an embodiment.

FIG. 13 is a schematic diagram of a turn-on control unit 509 according to an embodiment. The turn-on control unit 509 includes a detection circuit, a 2-to-1 multiplexer MUX1, a 2-to-1 multiplexer MUX2, a comparator CMP2, a comparator CMP3, and a NOT gate INV1. The detection circuit includes a detection capacitor Cd and a detection resistor Rd that are connected in series. A first end of the detection capacitor Cd is connected to the midpoint of the series connection between the switching transistor S1 and the switching transistor S2, a second end of the detection capacitor Cd is connected to a first end of the detection resistor Rd, and a second end of the detection resistor Rd is grounded. A midpoint of the series connection between the detection capacitor Cd and the detection resistor Rd is connected to a first input end of the comparator CMP2 and a first input end of the comparator CMP3, so that a voltage $V_{DT}$ at the midpoint of the series connection between the detection capacitor Cd and the detection resistor Rd may be input to the first input end of the comparator CMP2 and the first input end of the comparator CMP3.

It may be understood that, in a dead time during on/off switching between S1 and S2, the voltage at SW1 is increased (a process in which turn-on of S2 is switched to turn-on of S1) or decreased (a process in which turn-on of S1 is switched to turn-on of S2). A change in the voltage at SW1 causes a current id on the capacitor Cd. A magnitude of the current is as follows:

$$id = C\frac{dV_{SW1}}{dt}$$

After the current id flows through the resistor Rd, a voltage $V_{DT}$ is generated at the midpoint of the series connection between the detection capacitor Cd and the detection resistor Rd. A magnitude of $V_{DT}$ is as follows:

$$V_{DT} = id \cdot Rd = C\frac{dV_{SW1}}{dt} \cdot Rd$$

It can be understood from the foregoing formula that $V_{DT}$ is positively correlated to the change rate of the voltage at the midpoint SW1 of the series connection between the switching transistor S1 and the switching transistor S2. Therefore, $V_{DT}$ may be used to represent the change rate of the voltage at the midpoint SW1 of the series connection. The first turn-on indication signal and the second turn-on indication signal may be obtained by comparing $V_{DT}$ with other specified voltage values. Details are as follows:

A control terminal of the 2-to-1 multiplexer MUX1 is connected to an interface corresponding to the polarity identifier PAC of the alternating current voltage, two input terminals thereof respectively receive inputs of a first voltage $V_{HM\_THS}$ and a second voltage $V_{LM\_THS}$, and an output terminal thereof is connected to a second input end of the comparator CMP2. When the polarity identifier PAC of the alternating current voltage is 0, the 2-to-1 multiplexer MUX1 outputs the first voltage $V_{HM\_THS}$ to the second input end of the comparator CMP2. When the polarity identifier PAC of the alternating current voltage is 1, the 2-to-1 multiplexer MUX1 outputs the second voltage $V_{LM\_THS}$ to the second input end of the comparator CMP2.

A control terminal of the 2-to-1 multiplexer MUX2 is connected to the interface corresponding to the polarity identifier PAC of the alternating current voltage, two input terminals thereof respectively receive inputs of a third voltage $V_{HM\_THM}$ and a fourth voltage $V_{LM\_THM}$, and an output terminal thereof is connected to a second input end of the comparator CMP3. When the polarity identifier PAC of the alternating current voltage is 0, the 2-to-1 multiplexer MUX2 outputs the third voltage $T_{HM\_THM}$ to the second input end of the comparator CMP3. When the polarity identifier PAC of the alternating current voltage is 1, the 2-to-1 multiplexer MUX2 outputs the fourth voltage $V_{LM\_THM}$ to the second input end of the comparator CMP3.

The first input end of the comparator CMP2 is connected to the midpoint of the series connection between the detection capacitor Cd and the detection resistor Rd, the second input end of the comparator CMP2 is connected to the output terminal of the 2-to-1 multiplexer MUX1, and an output end of the comparator CMP2 outputs the first turn-on indication signal dt_ctrl1. For example, the comparator CMP2 is configured to compare the voltage $V_{DT}$ at the midpoint of the series connection between the detection capacitor Cd and the detection resistor Rd with a voltage $V_{THS}$ from the output terminal of the 2-to-1 multiplexer MUX1. If the voltage $V_{DT}$ at the midpoint of the series connection is greater than the voltage $V_{THS}$, a signal (the first turn-on indication signal dt_ctrl1) from the output end of the comparator CMP2 is set to 1. If the voltage $V_{DT}$ at the midpoint of the series connection is less than the voltage $V_{THS}$, a signal (the first turn-on indication signal dt_ctrl1) from the output end of the comparator CMP2 is set to 0.

The first input end of the comparator CMP3 is connected to the midpoint of the series connection between the detection capacitor Cd and the detection resistor Rd, the second input end of the comparator CMP3 is connected to the output terminal of the 2-to-1 multiplexer MUX2, and an output end of the comparator CMP3 outputs the second turn-on indication signal dt_ctrl2 by using the NOT gate INV1. For example, the comparator CMP3 is configured to compare the voltage $V_{DT}$ at the midpoint of the series connection between the detection capacitor Cd and the detection resistor Rd with a voltage VTHM from the output terminal of the 2-to-1 multiplexer MUX2. If the voltage $V_{DT}$ at the midpoint of the series connection is greater than the voltage $V_{THM}$, a signal from the output end of the comparator CMP3 is set to 1 (a signal obtained after the signal from the output end of the comparator CMP3 passes through the NOT gate INV1 is the second turn-on indication signal dt_ctrl2, and the second turn-on indication signal dt_ctrl2 is set to 0). If the voltage $V_{DT}$ at the midpoint of the series connection is less than the voltage $V_{THM}$, a signal from the output end of the comparator CMP3 is set to 0 (a signal obtained after the signal from the output end of the comparator CMP3 passes through the NOT gate INV1 is the second turn-on indication signal dt_ctrl2, and the second turn-on indication signal dt_ctrl2 is set to 1).

In this embodiment, in the two cases in which the polarity identifier PAC of the alternating current voltage is 1 and the polarity identifier PAC of the alternating current voltage is 0, voltages input from the second input end of the comparator CMP2 and the second input end of the comparator CMP3 are different. The following provides detailed explanations based on two cases.

Figures 14A, 14B:
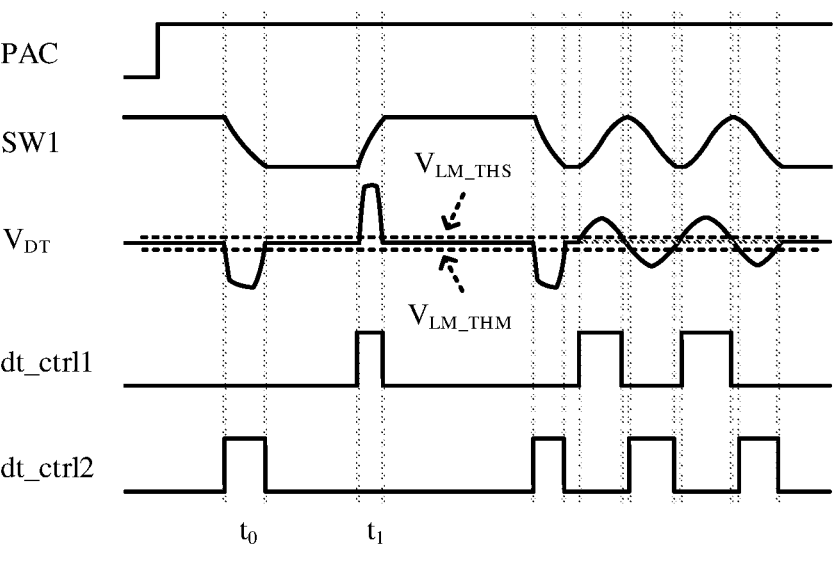
FIG. 14a is a diagram 1 of an input waveform and an output waveform of a turn-on control unit 509 according to an embodiment.
FIG. 14b is a diagram 2 of an input waveform and an output waveform of a turn-on control unit 509 according to an embodiment.

When PAC=1, an input waveform and an output waveform of the turn-on control unit 509 are shown in FIG. 14$a$ (FIG. 14$a$ is a diagram 1 of the input waveform and the output waveform of the turn-on control unit 509 according to this embodiment). When PAC=1, the 2-to-1 multiplexer MUX1 and the 2-to-1 multiplexer MUX2 each select a 1-channel. Therefore, the voltage $V_{THS}$ from the output terminal of the 2-to-1 multiplexer MUX1 is equal to $V_{LM\_THS}$, and the voltage $V_{THM}$ from the output terminal of the 2-to-1 multiplexer MUX2 is equal to $V_{LM\_THM}$. In this case, the input and output voltage waveform are shown in FIG. 14$a$. For the comparator CMP2, when the voltage $V_{DT}$ is greater than the threshold $V_{THS}$, the first turn-on indication signal dt_ctrl is set to 1 (if the voltage $V_{DT}$ is less than the threshold $V_{THS}$, the first turn-on indication signal dt_ctrl is 0). For the comparator CMP3, when the voltage $V_{DT}$ is less than the threshold $V_{THM}$, the second turn-on indication signal dt_ctr2 is set to 1 (if the voltage $V_{DT}$ is greater than the threshold $V_{THM}$, the second turn-on indication signal dt_ctr2 is 0).

When PAC=0, an input waveform and an output waveform of the turn-on control unit 509 are shown in FIG. 14$b$ (FIG. 14$b$ is a diagram 2 of the input waveform and the output waveform of the turn-on control unit 509 according to this embodiment). When PAC=0, the 2-to-1 multiplexer MUX1 and the 2-to-1 multiplexer MUX2 each select a channel 0. In this case, the voltage $V_{THS}$ from the output terminal of the 2-to-1 multiplexer MUX1 is equal to $V_{HM\_THS}$, and the voltage VTC from the output terminal of the 2-to-1 multiplexer MUX2 is equal to $V_{HM\_THM}$. Signal waveforms thereof are shown in FIG. 14$b$. For the comparator CMP2, when the voltage $V_{DT}$ is greater than the threshold $V_{THS}$, the first turn-on indication signal dt_ctrl is set to 1 (if the voltage $V_{DT}$ is less than the threshold $V_{THS}$, the first turn-on indication signal dt_ctrl is 0). For the comparator CMP3, when the voltage $V_{DT}$ is less than the threshold $V_{THM}$, the second turn-on indication signal dt_ctr2 is set to 1 (if the voltage $V_{DT}$ is greater than the threshold $V_{THM}$, the second turn-on indication signal dt_ctr2 is 0).

In this embodiment, a moment at which the voltage at SW1 is decreased to 0 or increased to $V_{OUT}$ may be obtained based on the first turn-on indication signal dt_ctrl1 and the second turn-on indication signal dt_ctrl2. For example, as shown in FIG. 14$a$, PAC=1; at a moment $t_0$, dt_ctrl2 changes from 1 to 0, and a voltage at the point SW1 is decreased to 0; and at a moment $t_1$, dt_ctrl1 changes from 1 to 0, and a voltage at the point SW is increased to $V_{OUT}$. For another example, as shown in FIG. 14$b$, PAC=0; at a moment $t_0$, dt_ctrl1 changes from 0 to 1, and a voltage at the point SW1 is decreased to 0; and at a moment $t_1$, dt_ctrl2 changes from 0 to 1, and a voltage at the point SW1 is increased to $V_{OUT}$. In this way, the switches may be controlled, based on the first turn-on indication signal dt_ctrl1 and the second turn-on indication signal dt_ctrl2, to be turned on, to implement ZVS. For example, when the voltage at the point SW1 is increased to $V_{OUT}$, S1 is turned on, and a voltage at two ends of S1 at a moment at which S1 is turned on is 0; and when the voltage at the point SW1 is decreased to 0, S2 is turned on, and a voltage at two ends of S2 at a moment at which S2 is turned on is 0. This implements ZVS of the switches.

6. PWM Control Unit 510

In this embodiment, the PWM control unit 510 is configured to perform PWM control on the switching transistor S1 and the switching transistor S2 based on the first turn-on indication signal dt_ctrl1, the second turn-on indication signal dt_ctrl2, the polarity identifier PAC of the alternating current voltage, the current polarity identifier icom0 of the inductor L, the result icom1 of comparison between the current of the inductor L and the first threshold, and the result tcm_flag of comparison between the voltage of the load 504 and the alternating current sampling voltage. The first turn-on indication signal dt_ctrl1 and the second turn-on indication signal dt_ctrl2 may be input to the PWM control unit 510 by the turn-on control unit 509, the polarity identifier PAC of the alternating current voltage may be input to the PWM control unit 510 by the alternating current signal processing unit 507, and the current polarity identifier icom0 of the inductor L, the result icom1 of comparison between the current of the inductor L and the first threshold and the result tcm_flag of comparison between the voltage of the load 504 and the alternating current sampling voltage may be input to the PWM control unit 510 by the turn-off control unit 508.

For example, a minimum period limit Ts_min may be set in the PWM control unit 510, to limit a maximum switching frequency of a switch. When Ts is less than Ts_min, and the frequency is limited, the PFC circuit module 501 enters a DCM mode. When Ts is greater than Ts_min, and the frequency is not limited, the PFC circuit module 501 works in a CRM mode. Ts is a time of timing started after the primary switch is turned on.

In this embodiment, the PWM control unit 510 executes two types of determining logic based on the input polarity identifier PAC of the alternating current voltage. When PAC=1 ($V_{AC}$ is greater than 0), the PWM control unit 510 executes a first type of determining logic. When PAC=0 ($V_{AC}$ is less than 0), the PWM control unit 510 executes a second type of determining logic. The following describes the first type of determining logic in detail.

Figure 15:
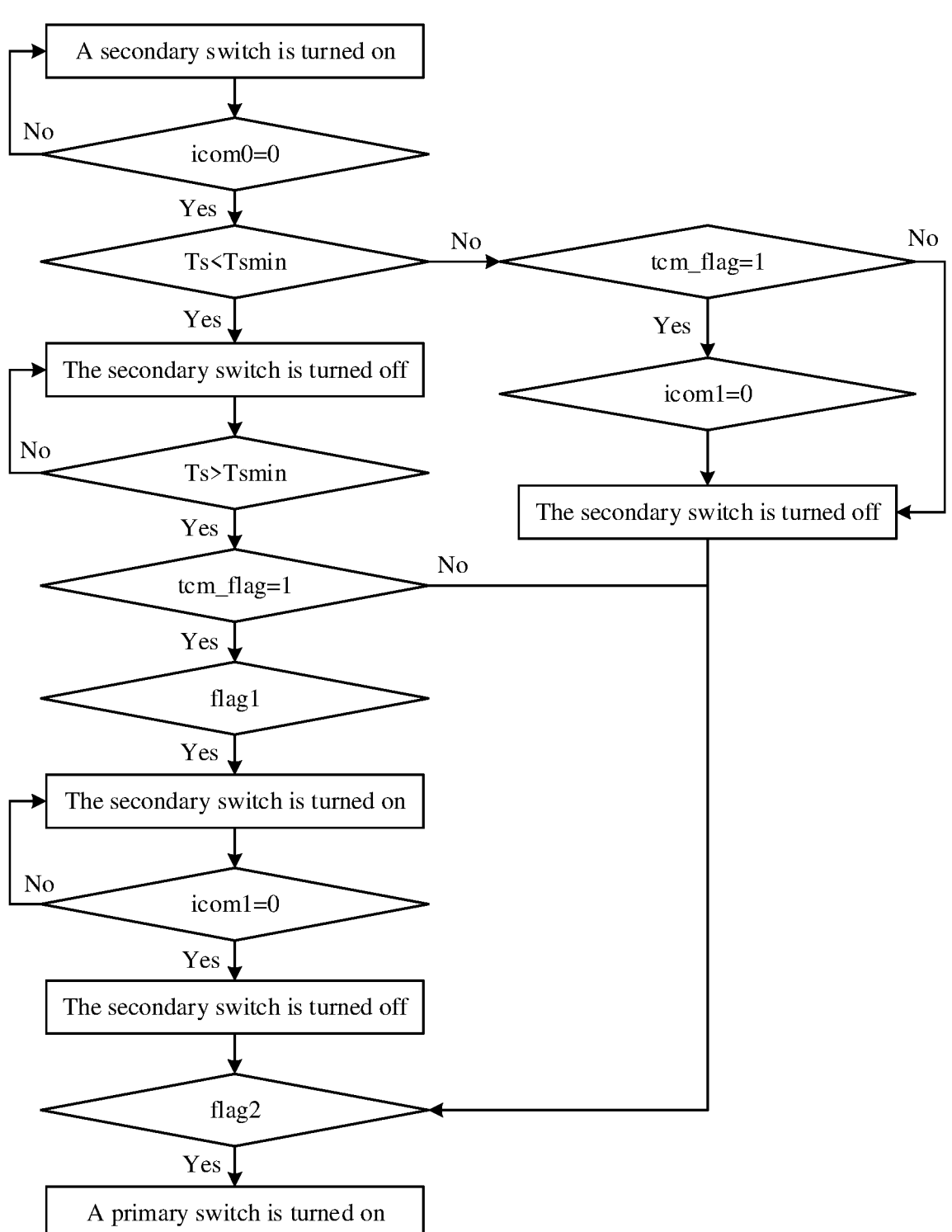
FIG. 15 is a schematic diagram of a first type of determining logic executed by a PWM control unit 510 according to an embodiment.

When PAC=1 ($V_{AC}$ is greater than 0), the primary switch is S2, and the secondary switch is S1. The first type of determining logic is shown in FIG. 15 (FIG. 15 is a schematic diagram of the first type of determining logic executed by the PWM control unit 510 according to this embodiment). For example, there are the following four modes for the logic:

First Mode:

When Ts is greater than Ts_min and tcm_flag is a first preset value (in this embodiment, the first preset value may be 0), the PWM control unit 510 determines, based on the current polarity identifier icom0 of the inductor L, a moment at which the secondary switch is turned off, and determines, based on the second turn-on indication signal dt_ctrl2, a moment at which the primary switch is turned on. Ts is a time of timing started after the primary switch is turned on last time, and the PWM control unit 510 may perform timing Ts by using a built-in timer. Ts_min is a specified minimum period limit. The PWM control unit 510 may record specified Ts_min by using an internal register.

FIG. 16$a$ is an operating waveform diagram in a first mode in an embodiment. As shown in FIG. 16$a$, at a moment $t_0$, the primary switch (S2) is turned on, and the PWM control unit 510 starts to perform timing of Ts by using a timer. After a moment $t_1$, Ts>Ts_min. At a moment $t_2$, an inductance current crosses zero, and the PWM control unit 510 identifies that icom0 changes to 0, Ts>Ts_min, and tcm_flag=0. It can be understood, based on a flowchart in FIG. 15, that the PWM control unit 510 may control, at the moment $t_2$, the secondary switch (S1) to be turned off; and the PFC circuit module 501 works in a CRM mode and then performs determining of flag2.

It may be understood that, in this embodiment, flag2 may be determined by the PWM control unit 510 based on the second turn-on indication signal dt_ctrl2. When dt_ctrl2 changes from 1 to 0, flag2=yes. In this case, a voltage at SW1 resonates to 0. Because PAC=1, and S2 is a primary switch, a drain-source voltage of the primary switch is 0 in this case. At a moment $t_4$, the primary switch is controlled to be turned on, to implement ZVS (when $V_{AC}$ is negative, that is, PAC=0, and S1 is a primary switch, and when dt_ctrl2 changes from 0 to 1, a voltage at SW1 resonates to $V_{OUT}$, and flag2=yes. In this case, a drain-source voltage of the primary switch is 0, and the primary switch is controlled to be turned on, to implement ZVS).
Second Mode:

When Ts is greater than Ts_min and tcm_flag is a second preset value (in this embodiment, the second preset value may be 1), the PWM control unit 510 determines, based on the result icom1 of comparison between the current of the inductor L and the first threshold, a moment at which the secondary switch is turned off, and determines, based on the second turn-on indication signal dt_ctrl2, a moment at which the primary switch is turned on.

Figures 16A, 16B:
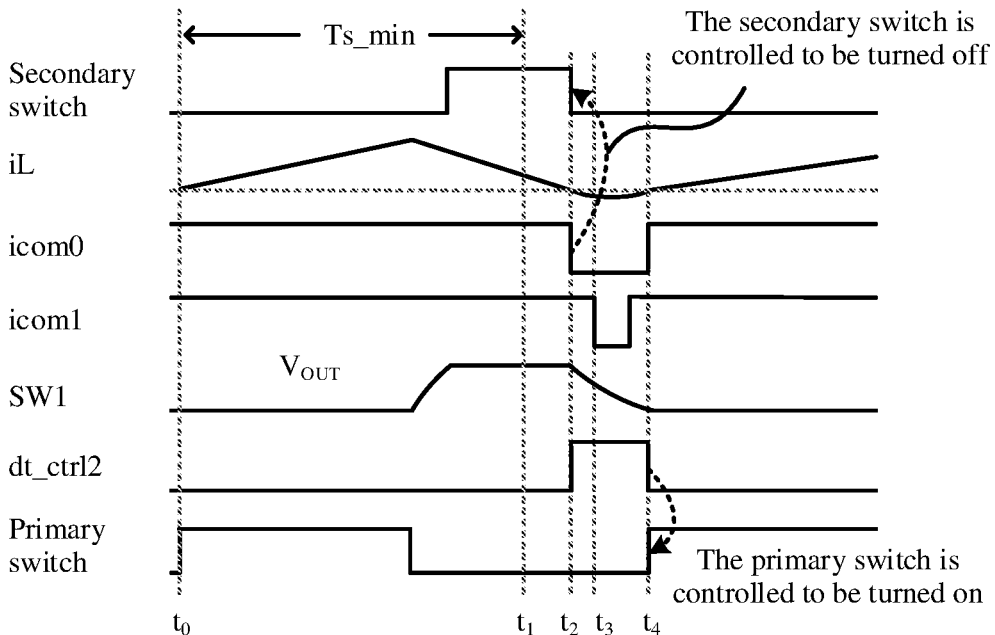
FIG. 16a is an operating waveform diagram in a first mode in an embodiment.
FIG. 16b is an operating waveform diagram in a second mode in an embodiment.

FIG. 16*b* is an operating waveform diagram in a second mode in an embodiment. As shown in FIG. 16*b*, at a moment $t_0$, the primary switch (S2) is turned on, and the PWM control unit 510 starts to perform timing of Ts by using a timer. After a moment $t_1$, Ts>Ts_min. At a moment $t_2$, an inductance current crosses zero, and the PWM control unit 510 identifies that icom0 changes to 0 and tcm_flag=1. It can be understood, based on the flowchart in FIG. 15, that the PWM control unit 510 performs determining of icom1. At a moment $t_3$, if the PWM control unit 510 identifies that icom1 changes to 0, the PWM control unit 510 controls the secondary switch (S1) to be turned off, and the PFC circuit module 501 works in a CRM mode and performs determining of flag2.

At a moment $t_4$, the PWM control unit 510 identifies that dt_ctrl2 changes from 1 to 0 and flag2=yes. This indicates that a voltage at SW1 resonates to 0 in this case. Therefore, at the moment $t_4$, the PWM control unit 510 may control the primary switch to be turned on, to implement ZVS.
Third Mode:

When Ts is less than Ts_min and tcm_flag is a first preset value (that is, 0), the PWM control unit 510 determines, based on icom0, a moment at which the secondary switch is turned off, and after Ts is greater than Ts_min, determines, based on the second turn-on indication signal dt_ctrl2, a moment at which the primary switch is turned on.

Figure 16C:
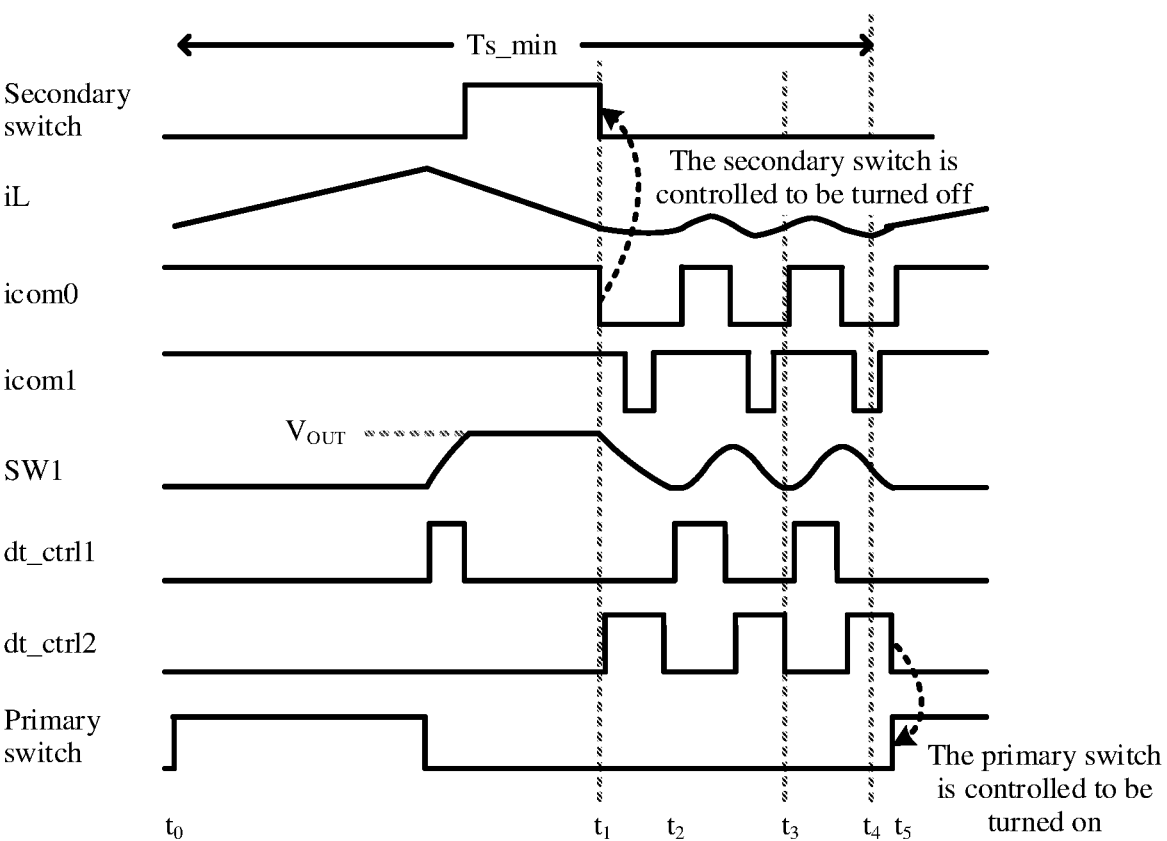
FIG. 16c is an operating waveform diagram in a third mode in an embodiment.

FIG. 16*c* is an operating waveform diagram in a third mode in an embodiment. As shown in FIG. 16*c*, at a moment $t_0$, the primary switch (S2) is turned on, and the PWM control unit 510 starts to perform timing of Ts by using a timer. At a moment $t_1$, Ts<Ts_min, an inductance current crosses zero, and the PWM control unit 510 identifies that icom0 changes to 0 and Ts<Ts_min. It can be understood, based on the flowchart in FIG. 15, that the PWM control unit 510 may control the secondary switch (S1) to be turned off, and the PFC circuit module 501 works in a DCM mode. Then, the PFC circuit module 501 enters a state in which the inductor L resonates with the parasitic capacitors. At a moment $t_4$, Ts>Ts_min and tcm_flag=0. It can be understood from the flowchart shown in FIG. 15 that the PWM control unit 510 performs determining of flag2.

At a moment $t_5$, the PWM control unit 510 identifies that dt_ctrl2 changes from 1 to 0 and flag2=yes. This indicates that a voltage at SW1 resonates to 0 in this case. Therefore, at the moment $t_5$, the PWM control unit 510 may control the primary switch to be turned on, to implement ZVS.
Fourth Mode:

When Ts is less than Ts_min and tcm_flag is a second preset value (that is, 1), the PWM control unit 510 determines, based on the current polarity identifier icom0 of the inductor L, a moment at which the secondary switch is turned off for the first time, and after Ts is greater than Ts_min, determines, based on the first turn-on indication signal dt_ctrl1, a moment at which the secondary switch is turned on again, determines, based on icom1, a moment at which the secondary switch is turned off again, and determines, based on the second turn-on indication signal dt_ctrl2, a moment at which the primary switch is turned on.

Figure 16D:
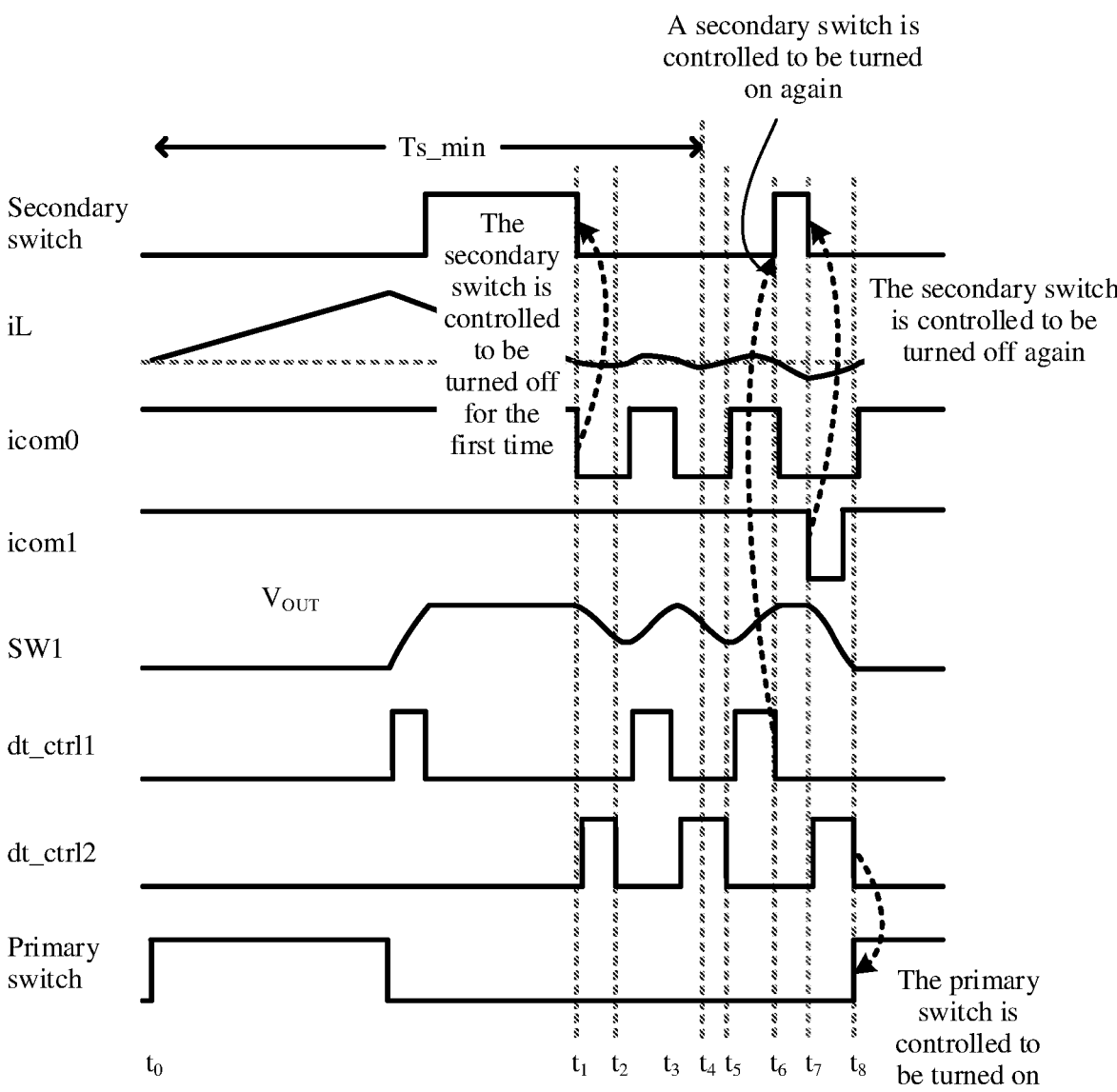
FIG. 16d is an operating waveform diagram in a fourth mode in an embodiment.

FIG. 16*d* is an operating waveform diagram in a fourth mode in an embodiment. As shown in FIG. 16*d*, at a moment $t_0$, the primary switch (S2) is turned on, and the PWM control unit 510 starts to perform timing of Ts by using a timer. At a moment $t_1$, Ts<Ts_min, an inductance current crosses zero, and icom0=0. It can be understood from the flowchart shown in FIG. 15 that the PWM control unit 510 may control, at the moment $t_1$, the secondary switch (S2) to be turned off, and the PFC circuit module 501 works in a DCM mode.

Then, the PFC circuit module 501 enters a state in which the inductor L resonates with the parasitic capacitors. At a moment $t_4$, Ts>Ts_min Because tcm_flag=1, the PWM control unit 510 performs determining of flag1. The determining of flag1 is controlled based on dt_ctrl1. When dt_ctrl1 changes from 1 to 0, flag1=yes. In this case, a voltage at SW1 resonates to $V_{OUT}$ (when $V_{AC}$ is negative, that is, PAC=0, and dt_ctrl1 changes from 0 to 1, a voltage at SW1 resonates to 0, and flag1=yes).

Therefore, at a moment $t_6$, flag1=1. This indicates that a voltage at SW1 resonates to $V_{OUT}$ in this case. It can be understood from the flowchart in FIG. 15 that the PWM control unit 510 may control the secondary switch to be turned on again and implement ZVS when the secondary switch is turned on.

At a moment $t_7$, the PWM control unit 510 identifies that icom1 changes to 0. Therefore, the PWM control unit 510 controls the secondary switch (S1) to be turned off. In addition, the PWM control unit 510 performs determining of flag2.

At a moment $t_8$, the PWM control unit 510 identifies that dt_ctrl2 changes from 1 to 0 and flag2=yes. This indicates that a voltage at SW1 resonates to 0 in this case. In this case, the PWM control unit 510 may control the primary switch to be turned on, to implement ZVS.

In actual application, when the PWM control unit 510 executes the first type of determining logic, which mode in the foregoing four modes is used in a specific implementation case is determined based on the specified minimum period limit Ts_min, the time Ts of timing started after the primary switch is turned on last time, the result tcm_flag of comparison between the voltage of the load 504 and the alternating current sampling voltage, and a specific circuit status. The foregoing case is not limited.

It can be understood from analysis of the foregoing four modes that, in this embodiment, ZVS of the primary switch and the secondary switch can be implemented regardless of which mode is used, in other words, full-range zero-voltage switching of the primary switch is implemented in a CRM mode and a DCM mode.

When PAC=0 ($V_{AC}$ is less than 0), the primary switch is S1, and the secondary switch is S2. In this case, the PWM control unit 510 may execute the second type of determining logic. A procedure of the second type of determining logic is the same as that of the first type of determining logic shown in FIG. 15, and only manners of determining flag1 and flag2 are different. For example, when $V_{AC}$ is negative, that is, PAC=0, when dt_ctrl2 changes from 0 to 1, flag2=yes; and when dt_ctrl1 changes from 0 to 1, flag1=yes.

In this embodiment, the PWM control unit 510 may include at least one processor, a memory, and a communication bus. The memory is a transient memory or a persistent memory, and the memory stores program code. The communication bus is connected to a plurality of communication interfaces. The plurality of communication interfaces are respectively connected to the alternating current signal processing unit 507, the turn-off control unit 508, and the turn-on control unit 509, and are configured to receive the first turn-on indication signal dt_ctrl1, the second turn-on indication signal dt_ctrl2, the polarity identifier PAC of the alternating current voltage, the current polarity identifier icom0 of the inductor L, the result icom1 of comparison between the current of the inductor L and the first threshold, and the result tcm_flag of comparison between the voltage of the load 504 and the alternating current sampling voltage. The processor communicates with the memory by using the communication bus, and executes the program code in the memory, to implement logical determining of the foregoing PWM control unit 510.

In some other embodiments, the PWM control unit 510 may be a programmable integrated circuit, an application-specific integrated circuit (ASIC), a chip, or the like. This is not limited in the embodiments.

Figure 17:
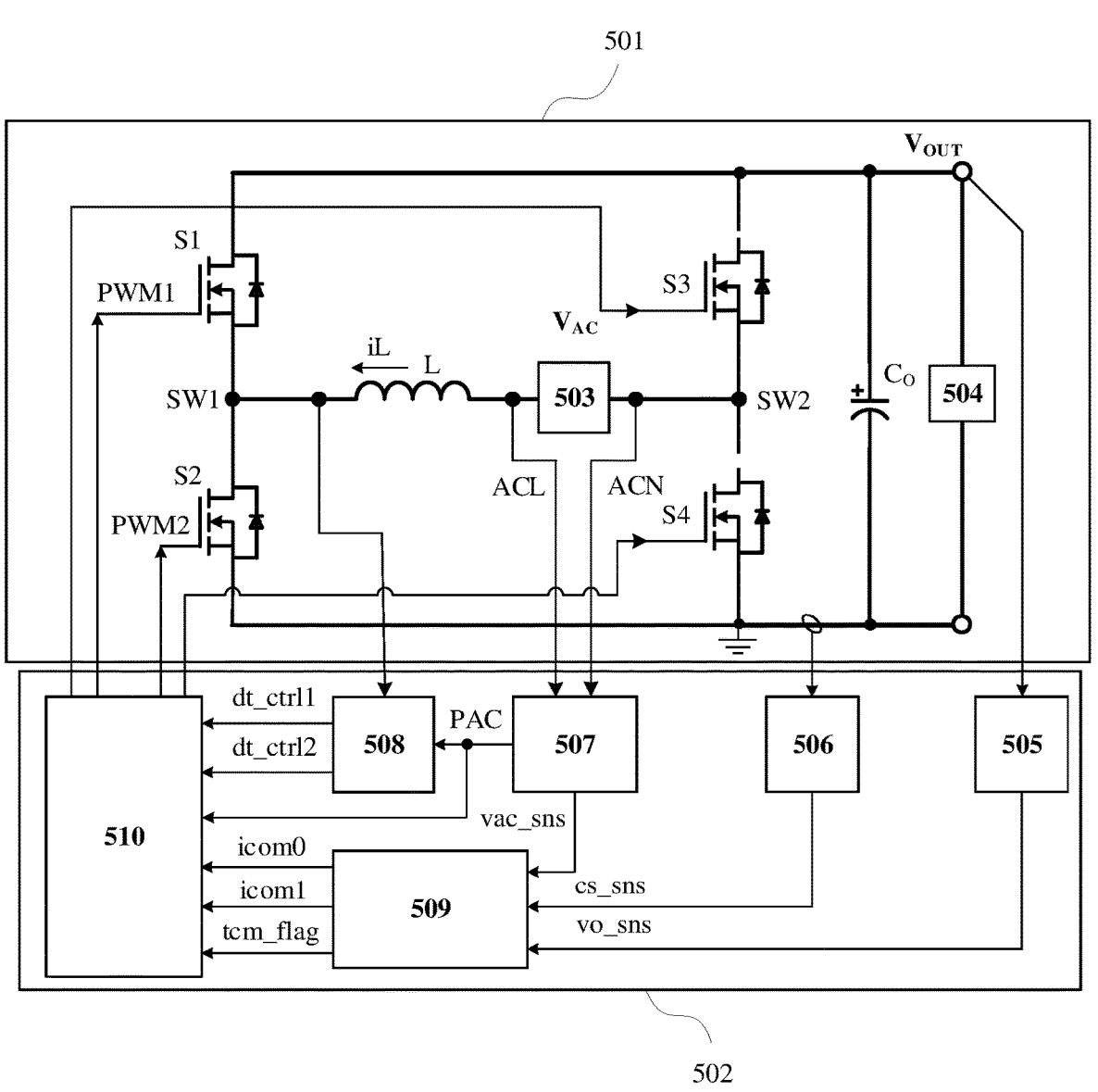
FIG. 17 is a schematic diagram of another totem-pole PFC circuit according to an embodiment.

In some other embodiments, the switch S3 and the switch S4 in the totem-pole PFC circuit shown in FIG. 5 may be replaced with MOSFETs or the like, as shown in FIG. 17 (FIG. 17 is a schematic diagram of another totem-pole PFC circuit according to an embodiment). Two output ends are added to the PWM control unit, are respectively connected to control terminals of the switch S3 and the switch S4 and are configured to control the switch S3 and the switch S4 to be turned on and turned off. For example, the PWM control unit may perform synchronous rectification on the switch S3 and the switch S4, that is, control turn-on moments and turn-off moments of the switch S3 and the switch S4 to be the same as those of the switch S3 and the switch S4 in the totem-pole PFC circuit shown in FIG. 5. It may be understood that cases of the totem-pole PFC circuit shown in FIG. 17 and the totem-pole PFC circuit shown in FIG. 15 may be the same except the foregoing cases. Therefore, other parts of the totem-pole PFC circuit shown in FIG. 17 are not described in this embodiment.

An embodiment further provides a power supply. The power supply includes the circuit in the embodiments corresponding to FIG. 5. It may be understood that embodiments may be applied to various power supplies that require power factor correction and whose powers are tens of watts to thousands of watts.

What is claimed is:

1. A power conversion circuit, comprising:
   a power factor correction (PFC) circuit module, and
   a PFC circuit controller, wherein the PFC circuit module comprises a first switching transistor, a second switching transistor, a third switching transistor, a fourth switching transistor, an inductor, a capacitor, an alternating current input terminal, and a load;

the inductor and the alternating current input terminal are connected in series between a midpoint of a series connection between the first switching transistor and the second switching transistor and a midpoint of a series connection between the third switching transistor and the fourth switching transistor;

two ends of the series connection between the first switching transistor and the second switching transistor and two ends of the series connection between the third switching transistor and the fourth switching transistor are connected in parallel with the load;

the capacitor is connected in parallel with the load;

the PFC circuit controller is configured to perform PWM control on the first switching transistor and the second switching transistor based on an acquired voltage of the load, a current of the inductor, an alternating current voltage at the alternating current input terminal, and a voltage at the midpoint of the series connection between the first switching transistor and the second switching transistor; and wherein the PFC circuit controller further comprises:

a voltage sensor configured to obtain the voltage of the load;

a current sampler configured to obtain the current of the inductor;

an alternating current signal processor configured to: obtain the alternating current voltage at the alternating current input terminal, and output a polarity identifier of the alternating current voltage and an alternating current sampling voltage based on the alternating current voltage, wherein the alternating current sampling voltage is obtained based on sampling of the alternating current voltage;

a turn-off controller configured to output a current polarity identifier of the inductor, a result of comparison between the current of the inductor and a first threshold, and a result of comparison between the voltage of the load and the alternating current sampling voltage based on the current of the inductor, the voltage of the load, and the alternating current sampling voltage;

a turn-on controller configured to output a first turn-on indication signal and a second turn-on indication signal based on the voltage at the midpoint of the series connection between the first switching transistor and the second switching transistor and the polarity identifier of the alternating current voltage; and a pulse width modulation (PWM) controller, configured to perform PWM control on the first switching transistor and the second switching transistor based on the first turn-on indication signal, the second turn-on indication signal, the polarity identifier of the alternating current voltage, the current polarity identifier of the inductor, the result of comparison between the current of the inductor and the first threshold, and the result of comparison between the voltage of the load and the alternating current sampling voltage.

2. The circuit according to claim 1, wherein the turn-on controller is configured to:

detect a change rate of the voltage at the midpoint of the series connection between the first switching transistor and the second switching transistor;

select one of a first comparison value and a second comparison value based on the polarity identifier of the alternating current voltage to obtain a first turn-on comparison value, and select one of a third comparison value and a fourth comparison value based on the polarity identifier of the alternating current voltage to obtain a second turn-on comparison value;

compare the change rate with the first turn-on comparison value to obtain the first turn-on indication signal; and compare the change rate with the second turn-on comparison value to obtain the second turn-on indication signal.

3. The circuit according to claim 1, wherein the turn-on controller comprises a detection circuit, a first 2-to-1 multiplexer, a second 2-to-1 multiplexer, a second comparator, a third comparator, and a NOT gate, wherein the detection circuit comprises a detection capacitor and a detection resistor that are connected in series, a first end of the detection capacitor is connected to the midpoint of the series connection between the first switching transistor and the second switching transistor, a second end of the detection capacitor is connected to a first end of the detection resistor, and a second end of the detection resistor is grounded;

a midpoint of the series connection between the detection capacitor and the detection resistor is connected to a first input end of the second comparator and a first input end of the third comparator;

a control terminal of the first 2-to-1 multiplexer is connected to an interface corresponding to the polarity identifier of the alternating current voltage, two input terminals thereof respectively receive inputs of a first voltage and a second voltage, and an output terminal thereof is connected to a second input end of the second comparator;

a control terminal of the second 2-to-1 multiplexer is connected to the interface corresponding to the polarity identifier of the alternating current voltage, two input terminals thereof respectively receive inputs of a third voltage and a fourth voltage, and an output terminal thereof is connected to a second input end of the third comparator;

an output end of the second comparator outputs the first turn-on indication signal; and an output end of the third comparator outputs the second turn-on indication signal by using the NOT gate.

4. The circuit according to claim 1, wherein the turn-off controller is configured to:

compare the current of the inductor with a preset inductance current zero-crossing threshold to obtain the current polarity identifier of the inductor;

obtain the first threshold through calculation based on the alternating current sampling voltage;

compare the current of the inductor with the first threshold to obtain the result of comparison between the current of the inductor and the first threshold; and obtain the result of comparison between the voltage of the load and the alternating current sampling voltage through calculation based on the voltage of the load and the alternating current sampling voltage.

5. The circuit according to claim 1, wherein the turn-off controller comprises a threshold calculator, a voltage comparator, a fourth comparator, and a fifth comparator, wherein a first input end of the fourth comparator receives the current of the inductor, a second input end thereof receives a preset inductance current zero-crossing threshold, and an output end thereof outputs the current polarity identifier of the inductor;

a first input end of the fifth comparator receives the current of the inductor, and an output end thereof outputs the result of comparison between the current of the inductor and the first threshold;

the threshold calculator is configured to: obtain the first threshold through calculation based on the alternating current sampling voltage, and output the first threshold to a second input end of the fifth comparator; and the voltage comparator configured to obtain and output the result of comparison between the voltage of the load and the alternating current sampling voltage based on the voltage of the load and the alternating current sampling voltage.

6. The circuit according to claim 5, wherein the threshold calculator is configured to: obtain the first threshold through calculation based on the alternating current sampling voltage and the voltage of the load, and output the first threshold to the second input end of the fifth comparator.

7. The circuit according to a claim 1, wherein the alternating current signal processor is configured to:

capture the alternating current voltage at two ends of the alternating current input terminal;

sample the alternating current voltage to obtain the alternating current sampling voltage; and compare the alternating current sampling voltage with a zero-crossing threshold of the alternating current sampling voltage to obtain the polarity identifier of the alternating current voltage.

8. The circuit according to claim 7, wherein the alternating current signal processor comprises an alternating current voltage sensor and a first comparator;

the alternating current voltage sensor is connected to the two ends of the alternating current input terminal, and is configured to obtain and output the alternating current sampling voltage based on the alternating current voltage at the alternating current input terminal; and a first input end of the first comparator receives the alternating current sampling voltage, a second input end thereof receives the zero-crossing threshold of the alternating current sampling voltage, and an output end thereof outputs the polarity identifier of the alternating current voltage.

9. The circuit according to claim 1, wherein the current sampler comprises a sampling resistor, a voltage sensor, and a calculator;

the sampling resistor is connected in series in a line between the load and the alternating current input terminal;

the voltage sensor is connected to two ends of the sampling resistor, and is configured to detect a voltage at the two ends of the sampling resistor; and the calculator is connected to the voltage sensor and is configured to calculate the current of the inductor based on the voltage at the two ends of the sampling resistor and a resistance value of the sampling resistor.

10. The circuit according to claim 9, wherein the current sampler is a current transformer; and the current transformer is connected to one end of the inductor and is configured to detect the current of the inductor.

11. The circuit according to claim 1, wherein when the alternating current input terminal outputs a positive voltage, the second switching transistor is a primary switch, and the first switching transistor is a secondary switch, the PWM controller configured to:

when Ts is greater than Ts_min and tcm_flag is a first preset value, determine, based on the current polarity identifier of the inductor, a moment at which the secondary switch is turned off, and determine, based on the second turn-on indication signal, a moment at which the primary switch is turned on, wherein Ts is a time of timing started after the primary switch is turned on last time, Ts_min is a specified minimum period limit, and tcm_flag is an identifier of the result of comparison between the voltage of the load and the alternating current sampling voltage;

when Ts is greater than Ts_min and tcm_flag is a second preset value, determine, based on the result of comparison between the current of the inductor and the first threshold, a moment at which the secondary switch is turned off, and determine, based on the second turn-on indication signal, a moment at which the primary switch is turned on;

when Ts is less than Ts_min and tcm_flag is a first preset value, determine, based on the current polarity identifier of the inductor, a moment at which the secondary switch is turned off, and after Ts is greater than Ts_min, determine, based on the second turn-on indication signal, a moment at which the primary switch is turned on; or when Ts is less than Ts_min and tcm_flag is a second preset value, determine, based on the current polarity identifier of the inductor, a moment at which the secondary switch is turned off for the first time, and after Ts is greater than Ts_min, determine, based on the first turn-on indication signal, a moment at which the secondary switch is turned on again, determine, based on the result of comparison between the current of the inductor and the first threshold, a moment at which the secondary switch is turned off again, and determine, based on the second turn-on indication signal, a moment at which the primary switch is turned on.

12. A power conversion circuit control method, wherein the power conversion circuit comprises a first switching transistor, a second switching transistor, a third switching transistor, a fourth switching transistor, an inductor, a capacitor, an alternating current input terminal, and a load; the inductor and the alternating current input terminal are connected in series between a midpoint of a series connection between the first switching transistor and the second switching transistor and a midpoint of a series connection between the third switching transistor and the fourth switching transistor; two ends of the series connection between the first switching transistor and the second switching transistor and two ends of the series connection between the third switching transistor and the fourth switching transistor are connected in parallel with the load; the capacitor is connected in parallel with the load; and the circuit control method comprises:

obtaining a voltage at two ends of the load, a current passing through the inductor, and an alternating current voltage at the alternating current input terminal;

determining polarity of the alternating current voltage and an alternating current sampling voltage based on the alternating current voltage, wherein the alternating current sampling voltage is obtained based on sampling of the alternating current voltage;

determining a current polarity identifier of the inductor, a result of comparison between the current of the inductor and a first threshold, and a result of comparison between the voltage of the load and the alternating current sampling voltage based on the current of the inductor, the voltage of the load, and the alternating current sampling voltage;

determining a first turn-on indication signal and a second turn-on indication signal based on a voltage at a midpoint of a series connection between the first switching transistor and the second switching transistor in the circuit and a polarity identifier of the alternating current voltage; and performing pulse width modulation (PWM) control on the first switching transistor and the second switching transistor based on the first turn-on indication signal, the second turn-on indication signal, the polarity identifier of the alternating current voltage, the current polarity identifier of the inductor, the result of comparison between the current of the inductor and the first threshold, and the result of comparison between the voltage of the load and the alternating current sampling voltage.

13. The method according to claim 12, wherein determining the first turn-on indication signal and a second turn-on indication signal based on a voltage at a midpoint of a series connection between the first switching transistor and the second switching transistor in the circuit and a polarity identifier of the alternating current voltage comprises:

detecting a change rate of the voltage at the midpoint of the series connection between the first switching transistor and the second switching transistor in the circuit;

selecting one of a first comparison value and a second comparison value based on the polarity identifier of the alternating current voltage to obtain a first turn-on comparison value, and selecting one of a third comparison value and a fourth comparison value based on the polarity identifier of the alternating current voltage to obtain a second turn-on comparison value;

comparing the change rate with the first turn-on comparison value to obtain the first turn-on indication signal; and comparing the change rate with the second turn-on comparison value to obtain the second turn-on indication signal.

14. The method according to claim 12, wherein when the alternating current input terminal outputs a positive voltage, the second switching transistor is a primary switch, and the first switching transistor is a secondary switch, and the method further comprises:

when Ts is greater than Ts_min and tcm_flag is a first preset value, determining, based on the current polarity identifier of the inductor, a moment at which the secondary switch is turned off, and determining, based on the second turn-on indication signal, a moment at which the primary switch is turned on, wherein Ts is a time of timing started after the primary switch is turned on last time, Ts_min is a specified minimum period limit, and tcm_flag is an identifier of the result of comparison between the voltage of the load and the alternating current sampling voltage;

when Ts is greater than Ts_min and tcm_flag is a second preset value, determining, based on the result of comparison between the current of the inductor and the first threshold, a moment at which the secondary switch is turned off, and determining, based on the second turn-on indication signal, a moment at which the primary switch is turned on;

when Ts is less than Ts_min and tcm_flag is a first preset value, determining, based on the current polarity identifier, a moment at which the secondary switch is turned off, and after Ts is greater than Ts_min, determining, based on the second turn-on indication signal, a moment at which the primary switch is turned on; or when Ts is less than Ts_min and tcm_flag is a second preset value, determining, based on the current polarity identifier, a moment at which the secondary switch is turned off for the first time, and after Ts is greater than Ts_min, determining, based on the first turn-on indication signal, a moment at which the secondary switch is turned on again, determining, based on the result of comparison between the current of the inductor and the first threshold, a moment at which the secondary switch is turned off again, and determining, based on the second turn-on indication signal, a moment at which the primary switch is turned on.

15. A power supply, comprising a power factor correction (PFC) circuit module and a controller, wherein the PFC circuit module comprises a first switching transistor, a second switching transistor, a third switching transistor, a fourth switching transistor, an inductor, a capacitor, an alternating current input terminal, and a load;

the inductor and the alternating current input terminal are connected in series between a midpoint of a series connection between the first switching transistor and the second switching transistor and a midpoint of a series connection between the third switching transistor and the fourth switching transistor;

two ends of the series connection between the first switching transistor and the second switching transistor and two ends of the series connection between the third switching transistor and the fourth switching transistor are connected in parallel with the load;

the capacitor is connected in parallel with the load;

the controller is configured to perform PWM control on the first switching transistor and the second switching transistor based on an acquired voltage of the load, a current of the inductor, an alternating current voltage at the alternating current input terminal, and a voltage at the midpoint of the series connection between the first switching transistor and the second switching transistor; and the controller further comprises:

a voltage sensor configured to obtain the voltage of the load;

a current sampler configured to obtain the current of the inductor;

an alternating current signal processor configured to: obtain the alternating current voltage at the alternating current input terminal, and output a polarity identifier of the alternating current voltage and an alternating current sampling voltage based on the alternating current voltage, wherein the alternating current sampling voltage is obtained based on sampling of the alternating current voltage;

a turn-off controller configured to output a current polarity identifier of the inductor, a result of comparison between the current of the inductor and a first threshold, and a result of comparison between the voltage of the load and the alternating current sampling voltage based on the current of the inductor, the voltage of the load, and the alternating current sampling voltage;

a turn-on controller configured to output a first turn-on indication signal and a second turn-on indication signal based on the voltage at the midpoint of the series connection between the first switching transistor and the second switching transistor and the polarity identifier of the alternating current voltage; and a pulse width modulation (PWM) controller configured to perform PWM control on the first switching transistor and the second switching transistor based on the first turn-on indication signal, the second turn-on indication signal, the polarity identifier of the alternating current voltage, the current polarity identifier of the inductor, the result of comparison between the current of the inductor and the first threshold, and the result of comparison between the voltage of the load and the alternating current sampling voltage.

16. The power supply according to claim 15, wherein the turn-on controller is configured to:

detect a change rate of the voltage at the midpoint of the series connection between the first switching transistor and the second switching transistor;

select one of a first comparison value and a second comparison value based on the polarity identifier of the alternating current voltage to obtain a first turn-on comparison value, and select one of a third comparison value and a fourth comparison value based on the polarity identifier of the alternating current voltage to obtain a second turn-on comparison value;

compare the change rate with the first turn-on comparison value to obtain the first turn-on indication signal; and compare the change rate with the second turn-on comparison value to obtain the second turn-on indication signal.

17. The power supply according to claim 15, wherein the turn-off controller is configured to:

compare the current of the inductor with a preset inductance current zero-crossing threshold to obtain the current polarity identifier of the inductor;

obtain the first threshold through calculation based on the alternating current sampling voltage;

compare the current of the inductor with the first threshold to obtain the result of comparison between the current of the inductor and the first threshold; and obtain the result of comparison between the voltage of the load and the alternating current sampling voltage through calculation based on the voltage of the load and the alternating current sampling voltage.

18. The power supply according to claim 15, wherein when the alternating current input terminal outputs a positive voltage, the second switching transistor is a primary switch, and the first switching transistor is a secondary switch, the PWM controller is configured to:

when Ts is greater than Ts_min and tcm_flag is a first preset value, determine, based on the current polarity identifier of the inductor, a moment at which the secondary switch is turned off, and determine, based on the second turn-on indication signal, a moment at which the primary switch is turned on, wherein Ts is a time of timing started after the primary switch is turned on last time, Ts_min is a specified minimum period limit, and tcm_flag is an identifier of the result of comparison between the voltage of the load and the alternating current sampling voltage;

when Ts is greater than Ts_min and tcm_flag is a second preset value, determine, based on the result of comparison between the current of the inductor and the first threshold, a moment at which the secondary switch is turned off, and determine, based on the second turn-on indication signal, a moment at which the primary switch is turned on;

when Ts is less than Ts_min and tcm_flag is a first preset value, determine, based on the current polarity identifier of the inductor, a moment at which the secondary switch is turned off, and after Ts is greater than Ts_min, determine, based on the second turn-on indication signal, a moment at which the primary switch is turned on; or when Ts is less than Ts_min and tcm_flag is a second preset value, determine, based on the current polarity identifier of the inductor, a moment at which the secondary switch is turned off for the first time, and after Ts is greater than Ts_min, determine, based on the first turn-on indication signal, a moment at which the secondary switch is turned on again, determine, based on the result of comparison between the current of the inductor and the first threshold, a moment at which the secondary switch is turned off again, and determine, based on the second turn-on indication signal, a moment at which the primary switch is turned on.

19. The power supply according to claim 15, wherein the turn-off controller comprises a threshold calculator, a voltage comparator, a fourth comparator, and a fifth comparator, wherein a first input end of the fourth comparator receives the current of the inductor, a second input end thereof receives a preset inductance current zero-crossing threshold, and an output end thereof outputs the current polarity identifier of the inductor;

a first input end of the fifth comparator receives the current of the inductor, and an output end thereof outputs the result of comparison between the current of the inductor and the first threshold;

the threshold calculator is configured to: obtain the first threshold through calculation based on the alternating current sampling voltage, and output the first threshold to a second input end of the fifth comparator; and the voltage comparator configured to obtain and output the result of comparison between the voltage of the load and the alternating current sampling voltage based on the voltage of the load and the alternating current sampling voltage.

20. The power supply according to claim 19, wherein the threshold calculator is configured to: obtain the first threshold through calculation based on the alternating current sampling voltage and the voltage of the load, and output the first threshold to the second input end of the fifth comparator.

* * * * *